United States Patent
Chung et al.

(10) Patent No.: US 11,801,937 B2
(45) Date of Patent: Oct. 31, 2023

(54) SYSTEMS AND METHODS FOR AVIAN FLOCK FLIGHT PATH MODIFICATION USING UAVS

(71) Applicants: California Institute of Technology, Pasadena, CA (US); Imperial College Innovations Limited, London (GB)

(72) Inventors: Soon-Jo Chung, La Canada, CA (US); Aditya Paranjape, London (GB); Kyunam Kim, Pasadena, CA (US)

(73) Assignees: California Institute of Technology, Pasadena, CA (US); Imperial College Innovations Limited, London (GB)

( * ) Notice: Subject to any disclaimer, the term of this patent is extended or adjusted under 35 U.S.C. 154(b) by 531 days.

(21) Appl. No.: 16/523,889

(22) Filed: Jul. 26, 2019

(65) Prior Publication Data

US 2020/0031465 A1    Jan. 30, 2020

Related U.S. Application Data

(60) Provisional application No. 62/703,759, filed on Jul. 26, 2018.

(51) Int. Cl.
*B64C 39/02*        (2023.01)
*A01M 29/06*        (2011.01)
(Continued)

(52) U.S. Cl.
CPC ............ *B64C 39/02* (2013.01); *A01K 29/005* (2013.01); *A01M 29/06* (2013.01); *B64F 1/36* (2013.01);
(Continued)

(58) Field of Classification Search
CPC .................................................... A01G 29/005
See application file for complete search history.

(56) References Cited

U.S. PATENT DOCUMENTS 8,812,156 B2 *   8/2014   Lee ................. A01M 29/10
                                                    700/253
8,988,230 B2 *   3/2015   Nohara ............ A01M 31/002
                                                    340/573.2
(Continued)

OTHER PUBLICATIONS

"Herding a Flock of Birds Approaching an Airport Using an Unmanned Aerial Vehicle" by Shripad Gade, Aditya A. Paranjape, and Soon-Jo Chung, published Jan. 2015 by the American Institute of Aeronautics and Astronautics. (Year: 2015).*

(Continued)

*Primary Examiner* — Magdalena Topolski
*Assistant Examiner* — Marisa V Conlon
(74) *Attorney, Agent, or Firm* — KPPB LLP

(57) ABSTRACT

Systems and methods for autonomously herding birds in accordance with embodiments of the invention are illustrated. One embodiment includes an autonomous flock herding system, including a bird location sensor, a drone; and a control system, including a processor, and a memory, the memory containing a flock herding application, where the application directs the processor to obtain bird position data from the at least one bird location sensor, where the bird position data describes the location of birds in a flock of birds, determine if the flock of birds will enter a protected zone, generate a set of waypoints using a flock dynamics model, instruct the unmanned aerial vehicle to navigate to at least one waypoint in the set of waypoints such that the flock of birds will, in response to the presence of the unmanned aerial vehicle at the at least one waypoint, change trajectory away from the protected zone.

20 Claims, 14 Drawing Sheets

(51) Int. Cl.
  A01K 29/00   (2006.01)
  B64F 1/36    (2017.01)
  B64U 101/00  (2023.01)
(52) U.S. Cl.
  CPC ...... B64U 2101/00 (2023.01); B64U 2201/10 (2023.01)

(56) References Cited

U.S. PATENT DOCUMENTS

| | | | |
|---|---|---|---|
| 2019/0011921 A1* | 1/2019 | Wang | H04N 5/23299 |
| 2019/0110461 A1* | 4/2019 | Caskey | B64F 1/36 |
| 2019/0152595 A1* | 5/2019 | Mitchell | B64C 39/024 |
| 2020/0201332 A1* | 6/2020 | Pedersen | B64D 47/02 |

OTHER PUBLICATIONS

"Clear Flight Solutions", Retrieved from: https://web.archive.org/web/20140227010509/www.clearflightsolutions.com/, Captured Feb. 27, 2014, 2 pgs.
"Standards for Aerodrome Bird/Wildlife Control", International Birdstrike Committee, Recommended Practices No. 1, Oct. 2006, 19 pgs.
Allan, "The costs of bird strike and bird strike prevention", Human Conflicts with Wildlife: Economic Considerations, USDA National Wildlife Research Center Symposia, Aug. 2000, pp. 147-153.
Ballerini et al., "Empirical investigation of starling flocks: a benchmark study in collective animal behaviour", Animal Behaviour, vol. 76, No. 1, May 6, 2008, pp. 201-215.
Ballerini et al., "Interaction ruling animal collective behavior depends on topological rather than metric distance: Evidence from a field study", PNAS, vol. 105, No. 4, Jan. 29, 2008, pp. 1232-1237.
Carere et al., "Aerial flocking patterns of wintering starlings, Sturnus vulgaris, under different predation risk", Animal Behaviour, vol. 77, No. 1, Jan. 2009, pp. 101-107.
Carrillo et al., "Nonlinear stability of flock solutions in second-order swarming models", Nonlinear Analysis: Real World Applications, vol. 17, Jun. 2014, pp. 332-343.
Chung et al., "Cooperative Robot Control and Concurrent Synchronization of Lagrangian Systems", IEEE Transactions on Robotics, vol. 25, No. 3, Jun. 2009, pp. 686-700.
Chung et al., "Phase synchronization control of complex networks of Lagrangian systems on adapative digraphs", Automatic, vol. 49, No. 5, May 2013, pp. 1148-1161.
Czirok et al., "Collective behavior of interacting self-propelled particles", Physica A: Statistical Mechanics and its Applications, vol. 281, No. 1, 2000, pp. 17-29.
Dimarogonas et al., "Further Results on the Stability of Distance-Based Mutli-Robot Formations", American Control Conference, Jun. 10-12, 2009, pp. 2972-2977.
Dimarogonas et al., "On the Stability of Distance-based Formation Control", Proceedings of the 47th IEEE Conference on Decision and Control, Dec. 9-11, 2008, pp. 1200-1205.
Dolbeer et al., "Wildlife Strikes to Civil Aircraft in the United States 1990-2013", Federal Aviation Administration, No. 20, Jul. 2014, 115 pgs.
Gade et al., "Robotic Herding Using Wavefront Algorithm: Performance and Stability", AIAA Guidance, Navigation, and Control Conference, San Diego, CA, AIAA Paper 2016-1378, Jan. 4-8, 2016, 16 pgs.
Handegard et al., "The Dynamics of Coordinated Group Hunting and Collective Information Transfer among Schooling Prey", Current Biology, vol. 22, No. 13, Jul. 10, 2012, pp. 1213-1217.
Haque et al., "A Hybrid, Multi-Agent Model of Foraging Bottlenose Dolphins", 3rd IFAC Conference on Analysis and Design on Hybrid Systems, ADHS'09—Proceedings, vol. 42, No. 17, 2009, pp. 262-267.
Haque et al., "Biologically inspired confinement of multi-robot systems", International Journal of Bio-Inspired Computation, vol. 3, No. 4, 2011, pp. 213-224.
Harris et al., "Evaluation of the Efficacy of Products and Techniques for Airport Bird Control", LGL Limited Aerodrome Safety Branch, King City, ON, Canada, Mar. 31, 1998, 209 pgs.
Hartman et al., "Autonomous Boids", Computer Animation and Virtual Worlds, vol. 17, No. 3-4, Jun. 14, 2006, 26 pgs.
Hemelrijk et al., "What underlies waves of agitation in starling flocks", Behavioral Ecology and Sociobiology, vol. 69, No. 5, Mar. 25, 2015, pp. 755-764.
Herbert-Read et al., "Initiation and spread of escape waves within animal groups", Royal Society Open Science, vol. 2, No. 4, Art No. 140355, Apr. 1, 2015, pp. 1-11.
Jadbabaie et al., "Coordination of Groups of Mobile Autonomous Agents Using Nearest Neighbor Rules", IEEE Transactions on Automatic Control, vol. 48, No. 6, Jun. 2003, pp. 988-1001.
Lee et al., "Dynamics of prey-flock escaping behavior in response to predator's attack", Journal of Theoretical Biology, vol. 240, No. 2, May 21, 2006, pp. 250-259.
Lien et al., "Shepherding Behaviors", Proceedings—IEEE International Conference on Robotics and Automation, vol. 4, Apr. 26-May 1, 2004, 6 pgs.
Lien et al., "Shepherding Behaviors with Multiple Shepherds", Proceedings—IEEE International Conference on Robotics and Automation, Apr. 18-22, 2005, 6 pgs.
Moreau, "Stability of continuous-time distributed consensus algorithms", 43rd IEEE Conference on Decision and Control, Dec. 14-17, 2004, pp. 3998-4003.
Nohara et al., "An Overview of Avian Radar Developments—Past, Present and Future", Bird Strike Committee, 9th Annual Meeting, Kingston, ON, Canada, Sep. 10-13, 2007, pp. 1-8.
Olfati-Saber, "Flocking for Multi-Agent Dynamic Systems: Algorithms and Theory", IEEE Transactions on Automatic Control, vol. 51, No. 3, Mar. 2006, pp. 401-420.
Olfati-Saber et al., "Consensus Problems in Networks of Agents With Switching Topology and Time-Delays", IEEE Transactions on Automatic Control, vol. 49, No. 9, Sep. 13, 2004, pp. 1520-1533.
Paranjape et al., "Motion primitives and 3D path planning for fast flight through a forest", The International Journal of Robotics Research, vol. 34, No. 3, Mar. 2015, pp. 357-377.
Pham et al., "Stable Concurrent Synchronization in Dynamic System Networks", arXiv.org, Retrieved from: https://arxiv.org/abs/q-bio/0510051, Jun. 1, 2006, 32 pgs.
Procaccini et al., "Propagating waves in starling, Sturnus vulgaris, flocks under predation", Animal Behaviour, vol. 82, No. 4, Oct. 2011, pp. 759-765.
Reynolds, "Flocks, Herds, and Schools: A Distributed Behavioral Model", ACM SIGGRAPH Computer Graphics, vol. 21, No. 4, Jul. 1987, pp. 25-34.
Sodhi, "Competition in the air: Birds versus aircraft", The Auk, vol. 119, No. 3, Jul. 2002, pp. 587-595.
Strombom et al., "Solving the shepherding problem: heuristics for herding autonomous, interacting agents", Journal of The Royal Society Interface, vol. 11, No. 100, Nov. 6, 2014, pp. 1-9.
Tanner et al., "Flocking in Fixed and Switching Networks", IEEE Transactions on Automatic Control, vol. 52, No. 5, May 2007, pp. 863-868.
Toner et al., "How birds fly together: Long-range order in a two-dimensional dynamical XY model", arXiv.org, Retrieved from: https://arxiv.org/abs/adap-org/9506001, Jun. 8, 1995, 11 pgs.
Vaughan et al., "Experiments in automatic flock control", Robotics and Autonomous Systems, vol. 31, No. 1-2, Apr. 30, 2000, 8 pgs.
Vicsek et al., "Novel Type of Phase Transition in a System of Self-Driven Particles", Physical Review Letters, vol. 75, No. 6, Aug. 7, 1995, pp. 1226-1229.
Zheng et al., "Behavior pattern (innate action) of individuals in fish schools generating efficient collective evasion from predation", Journal of Theoretical Biology, vol. 235, No. 2, Jul. 21, 2005, pp. 153-167.

* cited by examiner

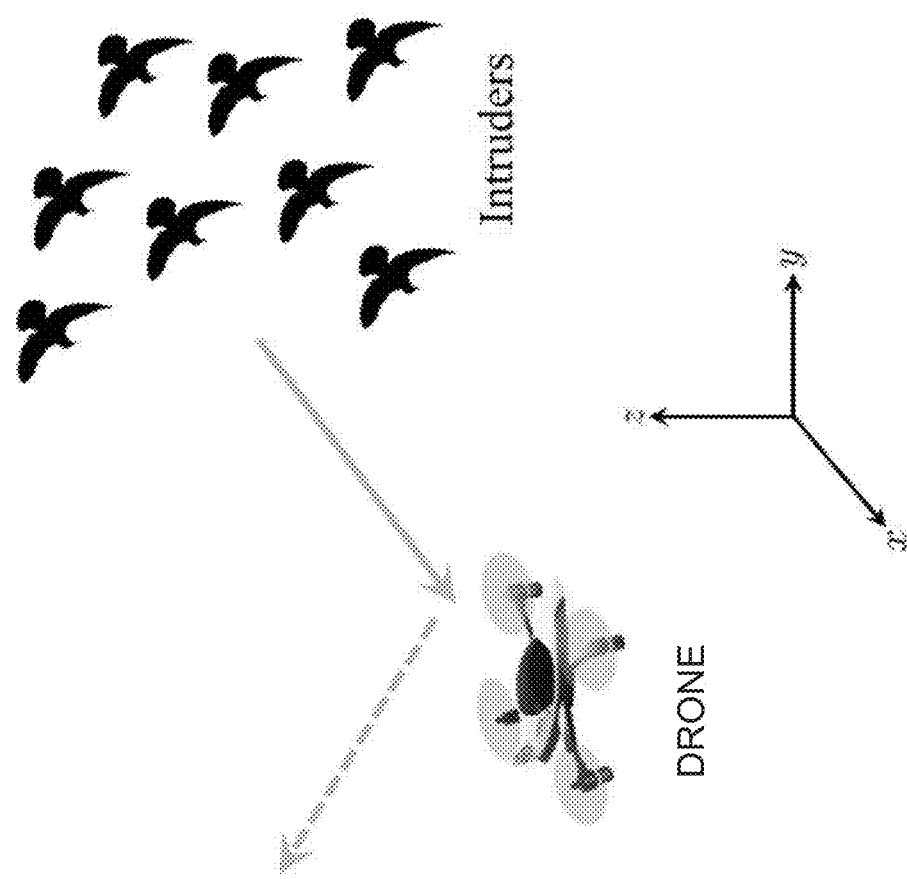
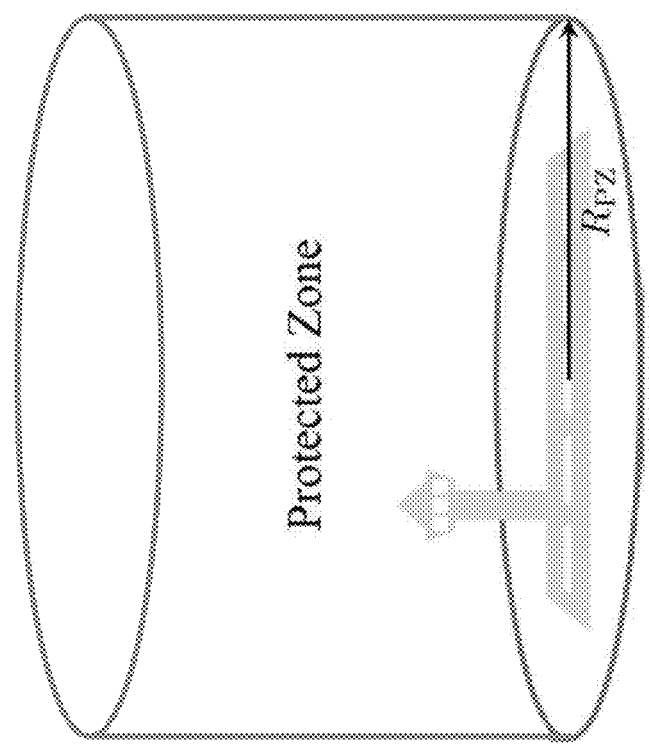
FIG. 3

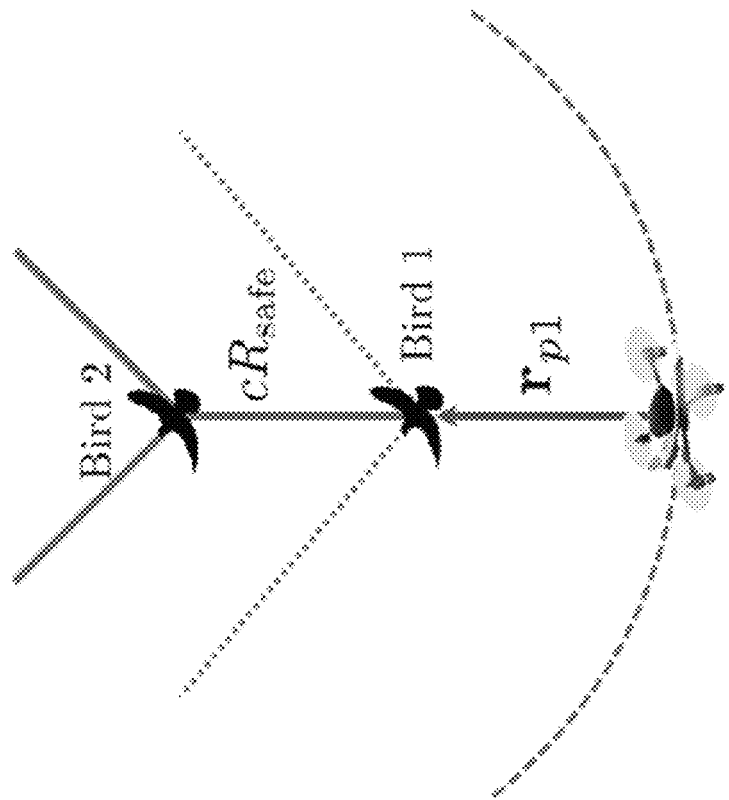
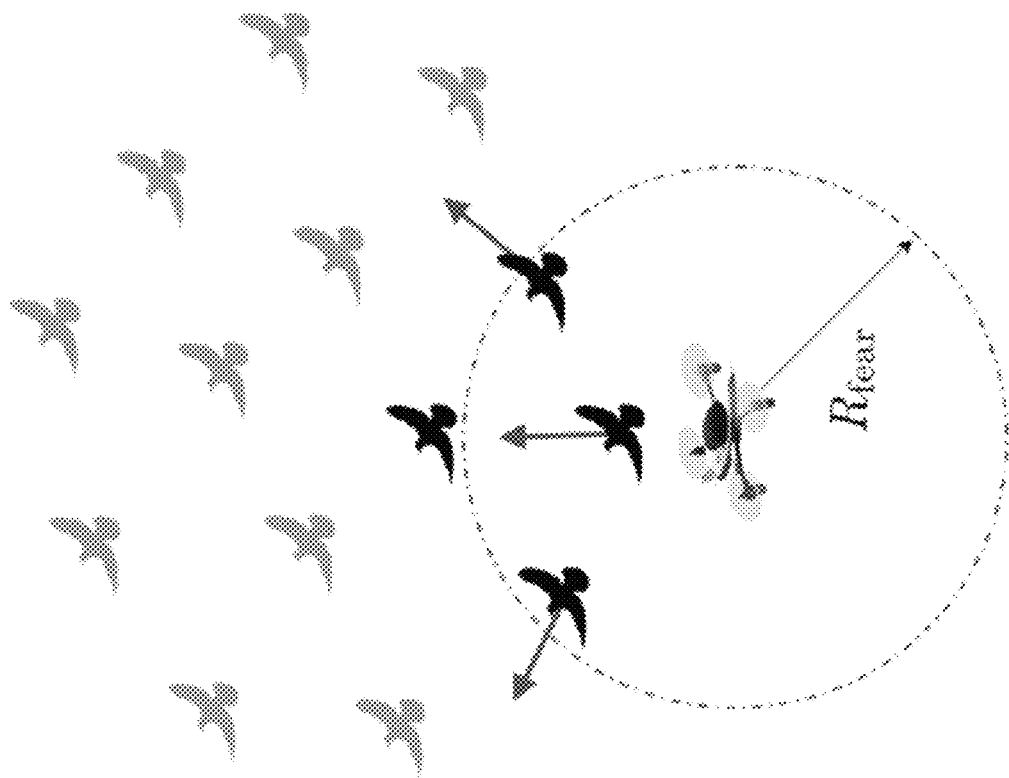
FIG. 7

Algorithm 1: $m$-Waypoint Herding Algorithm.

1: Input: $t$; $\tau_e$; small $\epsilon_1$, $\epsilon_2 > 0$; locus of $x_{div}$
2: updateWaypointsSet = TRUE
3: while $\|x_{cg} - x_{div}\| > \epsilon_1$ OR sign$(\hat{k}^\top(v_d \times r_{dc})) > -\epsilon_2$ do
4:    if updateWaypointSet = TRUE then
5:       $\mathcal{X}_p^m$ = CALL(Algorithm 2) {Waypoint selection}
6:       $t_{last} = t$; updateWaypointSet = FALSE; node = 1
7:    end if
8:    while updateWaypointSet = FALSE do
9:       if $\|x_p(t) - \mathcal{X}_p^m(\text{node})\| \geq \epsilon$ then
10:          $u_p(t) = \text{FLY}(\mathcal{X}_p^m(\text{node}))$
11:       else
12:          $u_p(t) = \text{ENGAGE}(\mathcal{X}_p^m(\text{node}); \tau_e)$
13:       end if
14:       if node = card$(\mathcal{X}_p^m)$ OR $t - t_{last} > t_{samp,max}$ then
15:          updateWaypointSet = TRUE
16:       end if
17:       node = node + 1
18:    end while
19: end while

FIG. 10

Algorithm 2: Selection of $m$ Waypoints.

1: Input: $\mathcal{X}_p, \hat{\mathbf{r}}, v_d, \Delta t_s$; MaxSampleNumber
2: Output: $\mathcal{X}_p^m$ {set of waypoints}
3: INITIALIZE: $\mathcal{X}_p^m = \{\}, \Gamma_p = \{\}$, counter $= 0$
4: while counter $<$ MaxSampleNumber do
5: $\quad x = U_s(\mathcal{X}_p)$ {Uniform sample in $\mathcal{X}_p$}
6: $\quad$ if $\rho(x) > 0$ AND $\|x - \mathcal{X}_p^m\| > \delta_w$ then
7: $\quad\quad \mathcal{X}_p^m \leftarrow \{\mathcal{X}_p^m, x\}$
8: $\quad\quad \Gamma_p \leftarrow \{\Gamma_p, \rho(x)\}$
9: $\quad$ end if
10: $\quad$ counter $=$ counter $+ 1$
11: end while
12: $(\mathcal{X}_p^m, \Gamma_p) \leftarrow$ SORT$(\mathcal{X}_p^m; \Gamma_p)$ {Descending order of $\rho(\cdot)$}
13: if card$(\mathcal{X}_p^m) > m$ then
14: $\quad \mathcal{X}_p^m \leftarrow \mathcal{X}_p^m(1:m)$
15: end if

*FIG. 11*

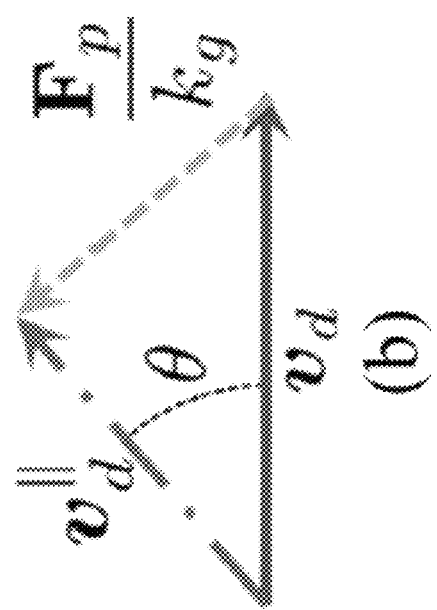
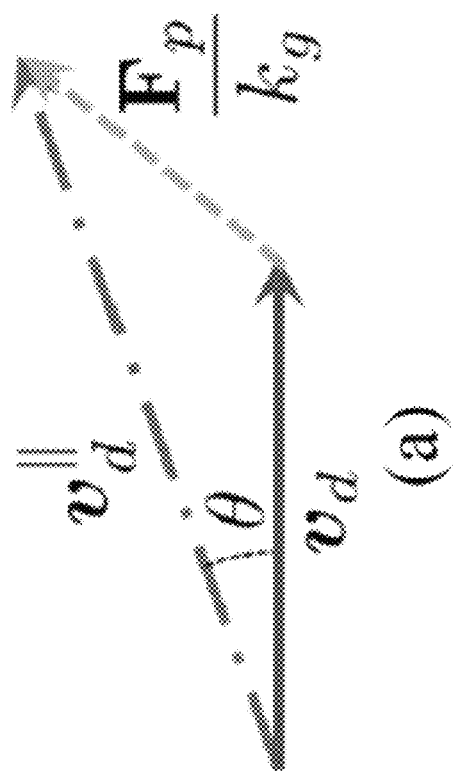
FIG. 13

SYSTEMS AND METHODS FOR AVIAN FLOCK FLIGHT PATH MODIFICATION USING UAVS

CROSS-REFERENCE TO RELATED APPLICATIONS

The present invention claims priority to U.S. Provisional Patent Application Ser. No. 62/703,759 entitled "Robotic Herding of a Flock of Birds using an Unmanned Aerial Vehicle" to Chung et al., filed Jul. 26, 2018, the disclosure of which is herein incorporated by reference in its entirety.

GOVERNMENT LICENSE RIGHTS

This invention was made with government support under Grant No(s). IIS1253758 and IIS1664186 awarded by the National Science Foundation. The government has certain rights in the invention.

FIELD OF THE INVENTION

The present invention generally relates to the herding of avians using unmanned aerial vehicles (UAVs, or colloquially "Drones"), and namely systems and methods for modifying flight path while maintaining flock integrity.

BACKGROUND

Unmanned Aerial Vehicles (UAVs), also referred to as "Drones" are autonomous robotic vehicles capable of flight. One of the most common UAV designs is the quadcopter, a four-rotor device capable of immediate movement in each of the three axes. However, there are many fixed-wing UAV designs as well.

Sharing the skies, many avian species travel in flocks. Flocks can be made up of any number of birds, from two to tens of thousands, depending on the species. Mixed flocks can also form from birds of two or more species. Flock movements, such as their flight paths and formations, are highly complex and dependent upon many factors.

SUMMARY OF THE INVENTION

Systems and methods for autonomously herding birds in accordance with embodiments of the invention are illustrated. One embodiment includes an autonomous bird flock herding system, including at least one bird location sensor, an unmanned aerial vehicle; and a flock herding control system, including a processor, and a memory, the memory containing a flock herding application, where the flock herding application directs the processor to obtain bird position data from the at least one bird location sensor, where the bird position data describes the location of birds in a flock of birds, determine if the flock of birds will enter a protected zone, generate a set of waypoints using a flock dynamics model, instruct the unmanned aerial vehicle to navigate to at least one waypoint in the set of waypoints such that the flock of birds will, in response to the presence of the unnamed aerial vehicle at the at least one waypoint, change trajectory away from the protected zone.

In another embodiment, in response to the presence of the unmanned aerial vehicle, the flock maintains integrity.

In a further embodiment, the protected zone is a cylinder.

In still another embodiment, the protected zone is over an airport.

In a still further embodiment, the at least one bird location sensor is an avian radar.

In yet another embodiment the system includes at least one environmental sensor, and the flock herding application further directs the processor to obtain environment data describing environmental conditions proximal to the protected zone from the at least one environmental sensor, and generate the set of waypoints using the environment data.

In a yet further embodiment, the environment data describes the position of airplanes.

In another additional embodiment, the environment data describes wind speed.

In a further additional embodiment, the flock herding application further directs the processor to obtain updated bird position data, and update the set of waypoints based on the updated bird position data.

In another embodiment again, the system includes a second unmanned aerial vehicle, and wherein the flock herding application further directs the processor to generate a second set of waypoints using the flock dynamics model, and instruct the second unmanned aerial vehicle to navigate to a given at least one waypoint in the second set of waypoints such that the flock of birds will, in response to the presence of the second unmanned aerial vehicle at the given at least one waypoint, change trajectory away from the protected zone.

In still yet another embodiment, in response to the presence of the unmanned aerial vehicle, the flock maintains integrity.

In a still yet further embodiment, the protected zone is a cylinder.

In still another additional embodiment, the protected zone is over an airport.

In a still further additional embodiment, the at least one bird location sensor is an avian radar.

In still another embodiment again, the method further includes obtaining, using the flock herding control system, environment data from at least one environmental sensor describing environmental conditions proximal to the protected zone from the at least one environmental sensor, and generating the set of waypoints using the environment data.

In a still further embodiment again, the environment data describes the position of airplanes.

In yet another additional embodiment, the environment data describes wind speed.

In a yet further additional embodiment, the method further includes obtaining, using the flock herding control system, updated bird position data, and updating, using the flock herding control system, the set of waypoints based on the updated bird position data.

In yet another embodiment again, the method further includes generating, using the flock herding control system, a second set of waypoints using the flock dynamics model, and instructing, using the flock herding control system, a second unmanned aerial vehicle to navigate to a given at least one waypoint in the second set of waypoints such that the flock of birds will, in response to the presence of the second unmanned aerial vehicle at the given at least one waypoint, change trajectory away from the protected zone.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 3 is a high-level illustration of a flock herding system in action in accordance with an embodiment of the invention.

FIG. 7 illustrates a typical subgraph in a dense flock and a subgraph with two birds collinear with a pursuer in accordance with an embodiment of the invention.

FIG. 10 is psuedocode for the m-waypoint herding algorithm in accordance with an embodiment of the invention.

FIG. 11 is psuedocode for the selection of m-waypoints in accordance with an embodiment of the invention.

FIG. 13 is a vector diagram illustrating push from the aft and from the front, respectively.

DETAILED DESCRIPTION

Figure 1:
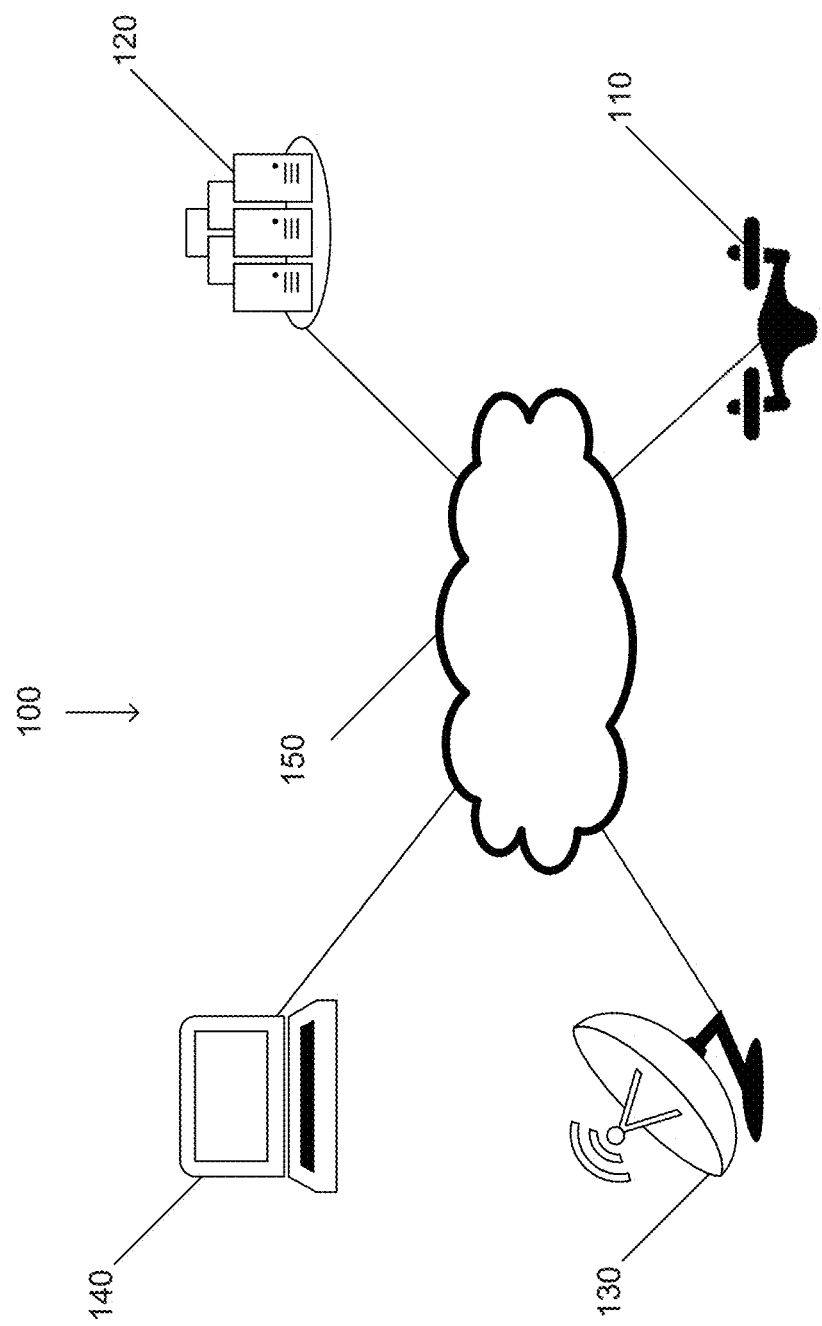
FIG. 1 is a conceptual system diagram for a flock herding system in accordance with an embodiment of the invention.

Turning now to the drawings, systems and methods for avian flight path modification using UAVs are illustrated. Flocks of birds are a common sight, and their dynamic movements are highly choreographed. The nature of these movements both in formation and flight path are complex and take place at high speeds. Unfortunately, there are many situations where the presence of birds are highly problematic to human activities and infrastructure. For example, in the case of US Airways Flight 1549, colloquially referred to as the "Miracle on the Hudson," the airplane on ascent after takeoff struck a flock of geese and was forced to ditch into the Hudson river. While keeping the skies clear over a small area has been traditionally handled by trained birds of prey, for example the famous Harris's Hawks of Wimbledon, this solution is not easily scaleable nor feasible in many situations.

Drones, however, as opposed to biological solutions, are mass-producible, highly controllable, and can be stored long-term in many different conditions with considerably less maintenance. While there have been some attempts to utilize drones to scare away birds from airports (for example RoBird of the Netherlands), these systems are often remote controlled and designed to scare birds away. Both of these factors can cause significant issues, as both the ineffectiveness of human piloting and unrefined scare tactics can lead to flocks of birds to split up, which simply causes more problems in the form of multiple sub-flocks which must now be controlled. In turn, this requires additional UAVs or other interdiction methods (e.g. air cannons, lasers, biological solutions, etc.) which escalate cost and increase the likelihood of strikes.

In contrast to the conventional "scare-tactics" which can split flocks, systems and methods described herein can mitigate these issues by utilizing autonomous drones to manipulate the movements of flocks of birds to guide them outside of a predefined geographic region without disrupting the flock unit. This process is referred to as "herding," because the flock is left intact. In many embodiments, multiple drones acting in accordance with methods described herein can work in tandem to herd a single flock, or to herd multiple flocks at once. Autonomous drones with appropriate sensing platforms can be pre-loaded with control software and deployed to safely remove birds in any number of scenarios not limited to airports. However, for ease of description, airports will be discussed in greater detail, and one of ordinary skill in the art would understand that the systems and methods described herein could easily be deployed in alternative scenarios and locations.

In order to maintain flock integrity, in many embodiments, herding processes include real-time modeling of a flock and the expected response of the flock to external pursuers. In many embodiments, a number of waypoints are calculated for the drone to maneuver to in relation to the flock. The model of the flock dynamics can be used to generate waypoints that avoid flock fragmentation and/or reduce the amount of physical space that the flock occupies (e.g. promote tighter flying formations). In numerous embodiments, multiple drones can be utilized, each with their own set of waypoints collectively calculated to herd the flock. Flock herding systems are discussed in more detail below.

Flock Herding Systems

Flock herding systems are systems which prevent flocks of birds from entering a pre-defined geographical region, or a "protected zone." In many embodiments, a protected zone includes the airspace above a particular region. As mentioned above, protected zones can be any number of different regions, and are not defined by any particular geographic feature. Drones can be utilized either alone or in tandem to keep birds out of the protected zone. In many embodiments, drones have sensors to enable them to at least detect birds and/or other drones. However, in numerous embodiments, external sensors and/or sensor arrays are utilized to track bird movements.

Turning now to FIG. 1, a flock herding system in accordance with an embodiment of the invention is illustrated. Flock herding system 100 includes a drone 110 and a flock herding control system 120. In many embodiments, drones are quadcopters, however, any number of different drone platforms can be utilized, including, but not limited to, those that mimic birds of prey, fixed wing unmanned craft, single or other multi-rotor craft, and or any other UAV as appropriate to the requirements of specific applications of embodiments of the invention. Flock herding control systems are computing platforms capable of ingesting bird position data and producing waypoints for drones to navigate to in order to remove flocks from a protected zone. In many embodiments, flock herding control systems are implemented on local computing platforms such as a server or personal computer. However, flock herding control systems can be implemented using cloud computing architecture and/or any number of different computing platforms as appropriate to the requirements of specific applications of embodiments of the invention.

Flock herding system 100 further includes a bird location sensor 130. In many embodiments, bird location sensors 130 are avian radars. However, bird location sensors can be any sensor platform capable of reporting the location of birds in a protected zone in at least near real-time. In numerous embodiments, flock herding systems include additional sensors for tracking other environmental objects or conditions (collectively "environmental sensors"). For example, if an airport is in a protected zone, additional environmental data can be produced regarding the position of nearby aircraft. Further, environmental conditions such as wind speed, humidity, temperature, cloud cover, time, date, and any other environmental information can be captured by sensors and provided to flock herding control systems for use in waypoint generation and/or other control functions.

Flock herding system 100 additionally includes an interface device 140. Interface devices are any device capable of enabling a user to communicate with a flock herding control system or a drone. In many embodiments, interface devices are personal computers, but can be any number of digital communication devices such as, but not limited to, smart phones, smart TVs, tablet computers, and/or any other digital communication device as appropriate to the requirements of specific applications of embodiments of the invention. Components of the flock herding system 100 communicate via a network 150. In many embodiments, the network is a composite network made of multiple different interconnected networks which can be implemented using the same or different communications protocols. For example, networks can be wired, wireless, or a combination thereof. For example, in some embodiments, flock herding control systems communicate with bird location sensors on a particular network, and the flock herding control system provides data to the drones via a separate network. One of ordinary skill in the art would appreciate that any different number of system architectures and/or communications architectures can be utilized as appropriate to the requirements of specific applications of embodiments of the invention, including, but not limited to, those that utilize different environmental sensors and/or different numbers of drones.

Figure 2:
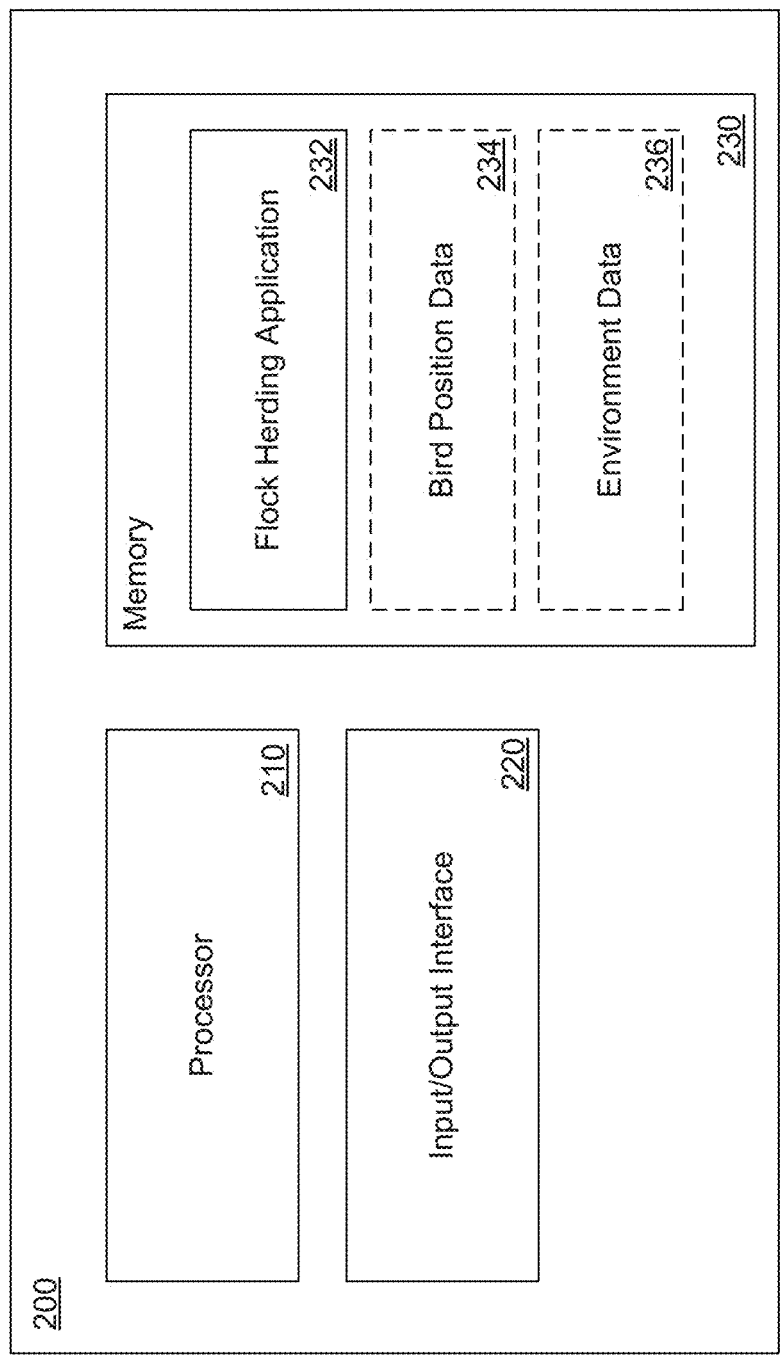
FIG. 2 is a conceptual block diagram for a flock herding control system in accordance with an embodiment of the invention.

Turning now to FIG. 2, a conceptual block diagram of a flock herding control system in accordance with an embodiment of the invention is illustrated. Flock herding control system 200 includes a processor 210. Processors can be any number of logic processing circuitries including, but not limited to central processing units (CPUs), graphics processing units (GPUs), field programmable gate arrays (FPGAs), application specific integrated circuits (ASICs), and/or any other logic processing circuitry capable of computation. In many embodiments, more than one processor is utilized. Flock herding control system 200 further includes an input/output interface 220. Input/output interfaces enable communication to other parts of flock herding systems.

Flock herding control system 200 further includes a memory 230. Memories can be implemented using volatile memory, non-volatile memory, or a combination of both. Memory 230 contains a flock herding application 232. Flock herding applications instruct the processor to generate waypoints for drones to navigate to in order to herd flocks away from protected zones. In many embodiments, memory 230 further contains bird position data 234 and/or environment data 236. As noted above, bird position data describes the 3D coordinate location of birds in range of the protected zone, and environment data describes various environmental conditions.

In many embodiments, flock herding control systems are implemented on standard computing platforms. However, flock herding control systems can be integrated into drones so long as the drone platform has sufficient computing capabilities. As one can appreciate, any number of different implementations of system architectures and flock herding control systems can be utilized to generate waypoints that enable drones to successfully herd flocks away from a protected zone as appropriate to the requirements of specific applications of embodiments of the invention. Processes for generating waypoints are discussed below.

Generating Waypoints for Flock Herding

As noted above, a key problem with conventional bird dispersal techniques is the fracturing of flocks into individual birds and/or subflocks. This creates significant inefficiencies as the fractured units are dispersed over a wider area and then must each individually be dealt with. In contrast, processes described herein can generate waypoints that, which when navigated to by a drone, will herd a flock away from a protected zone without fracturing the flock. This leads can lead to an increase in efficiency at least by requiring fewer drones, quicker dispersal times, and more efficient use of resources generally.

By way of example, a high-level conceptual illustration of the effect of a flock herding process in accordance with an embodiment is illustrated in FIG. 3. In this case an airport is within a cylindrical protected zone with radius $R_{PZ}$. However, protected zones are not required to be cylindrical, and be any number of shapes, for example, a sphere, a cube, a polyhedron, or a composite shape. When an flock on an intruding path is detected, a drone is dispatched to herd the flock away from the protected zone.

Figure 4:
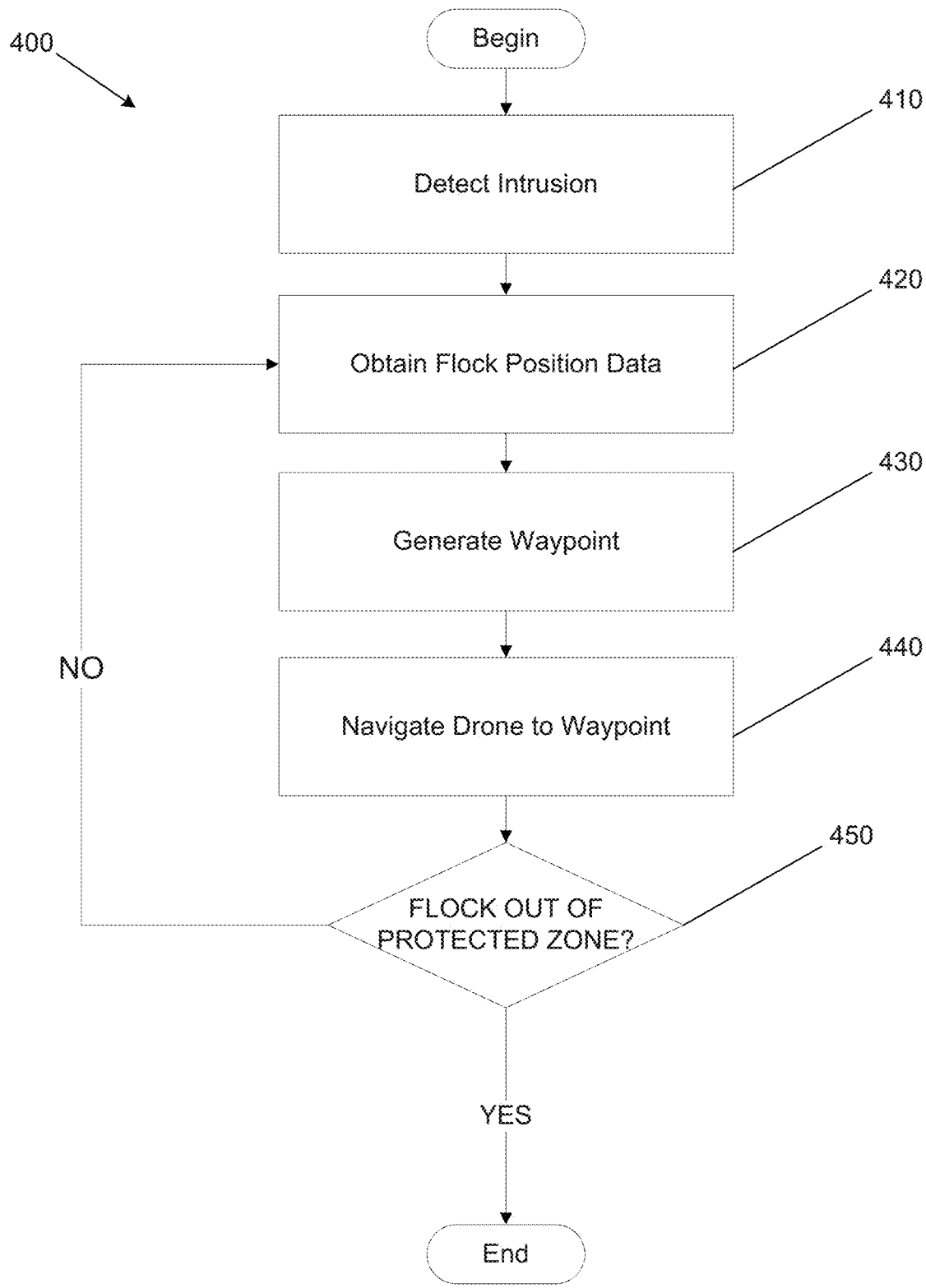
FIG. 4 is a flowchart illustrating a flock herding process in accordance with an embodiment of the invention.

Turning now to FIG. 4, a high-level flowchart for a flock herding process in accordance with an embodiment of the invention is illustrated. Process 400 includes detecting (410) an intrusion. In many embodiments, the intrusion is determined when a flock enters a protected zone. However, intrusion can be determined when a flock is determined to be on a trajectory that will lead to the protected zone. In numerous embodiments, this is accomplished by having a zone outside the protected zone where flocks are tracked to determine if herding is necessary.

To accomplish successful herding, the "m-waypoint herding algorithm" has been developed. At a high level, a drone interacts with the intruding flock by positioning itself sequentially at a periodically refreshed set of m points. The inherent stability of the flocking dynamics are leveraged to prevent fragmentation, and the m points can be selected to maximize the deflection of the flock's flight path.

Turning now to FIG. 4, a particular implementation of a flock herding process utilizing the m-waypoint herding algorithm in accordance with an embodiment of the invention is illustrated. Process 400 further includes obtaining (420) flock position data. In numerous embodiments, the flock position data is obtained from the bird location sensor. Flock position data can described the location of individual birds, or the location of a flock as a whole. In many embodiments, individual bird locations can be aggregated into a single unit representing a flock. For example, by measuring proximity, speed, direction, and/or any other positioning measurement, birds flying in a coherent pattern and/or in proximity can be grouped. A waypoint is generated (430) and a drone is navigated (440) to the waypoint. If the flock is not yet out of the protected zone (450), then updated flock position data can be obtained and a new waypoint can be generated for the drone to navigate to until the flock has been successfully removed. In numerous embodiments, waypoints are generated as a sequential set instead of one at a time, and the drone navigates to each point in order. In a variety of embodiments, the set of waypoints is continuously updated. In many embodiments, multiple sets of waypoints can be generated for multiple drones to work in tandem to herd the same flock, and/or different flocks.

In order to generate the waypoints, an understanding of flock dynamics can be modeled from which the basis of the m-waypoint herding algorithm can be formulated. Consider a flock of n (usually $\gg 1$) birds. The position and the velocity of the $i^{th}$ bird are denoted by $x_i \in \mathbb{R}^3$ and $v_i \in \mathbb{R}^3$, respectively. The vector between the $i^{th}$ and $j^{th}$ birds is denoted by $r_{ij}=x_j-x_i$. The subscript 'p' is used for the pursuer, so that $x_p$ denotes its position vector, and $r_{pi}=x_i-x_p$ is the vector from the pursuer to the $i^{th}$ bird. Given a vector r, the unit vector along r is denoted by $\hat{r}$.

Let $R_{com}$ denote the communication range for interaction between two birds. The neighborhood set of the $i^{th}$ bird is defined using the standard Euclidean distance as, $$\mathcal{N}_{i,i} = \{j \leq n : \|x_i - x_j\| \leq R_{com}\}. \quad (1)$$

and it is assumed that two birds interact only if their distance is less than or equal to $R_{com}$. The set of birds (v) thus forms a graph $G=(v, \varepsilon)$ where $$v=\{1,2,\ldots,n\},$$

$$\varepsilon = \{(i,j) \in v \times v | j \in \mathcal{J}_i \subseteq \mathcal{N}_{i,i}\}, \text{card}(\varepsilon)=p \quad (2)$$

Note that if $\mathcal{J}_i = \mathcal{N}_{i,i}$ for all i, the graph is undirected. Otherwise, it is directed. The incidence matrix of the graph is denoted as $B_c \in \mathbb{R}^{n \times p}$. Recall that the $(i,j)^{th}$ b entry of $B_c$ is 1 if the $j^{th}$ edge is incoming at i, −1 if outgoing at i, and 0 otherwise. An undirected edge is treated as two separate directed edges in this formulation of $B_c$. $\Delta(v)$ denotes the diagonal matrix formed by the elements of the tuple v. Finally, the centroid and the radius of the flock are defined as $$x_{cg} = \frac{1}{n}\sum_{i=1}^{n} x_i, \, R_F \triangleq \max_i \|x_i - x_{cg}\| \quad (3)$$

A. Flock Dynamics

The dynamics of an individual ($i^{th}$) bird are described by a nonlinear, second-order differential equation based on Reynolds' rules and augmented with an evasive response:

$$\dot{x}_i = v_i \quad (4)$$

$$\dot{v}_i = k_s \sum_{j \in \mathcal{J}_i} \left(1 - \frac{R_{safe}^3}{\|r_{ij}\|^3}\right) r_{ij} + k_a \sum_{j \in \mathcal{J}_i} (v_j - v_i) + k_g(v_d - v_i) + k_p H(r_{pi})$$

where $R_{safe}$ denotes the steady-state distance between two adjacent members of the flock; $v_d$ denotes the pre-selected, steady velocity of each member of the flock; and $H(r_{pi})=H(x_i-x_p)$ denotes the evasive response to the pursuer. It is assumed that $v_d$ lies in the horizontal plane.

Figure 5:
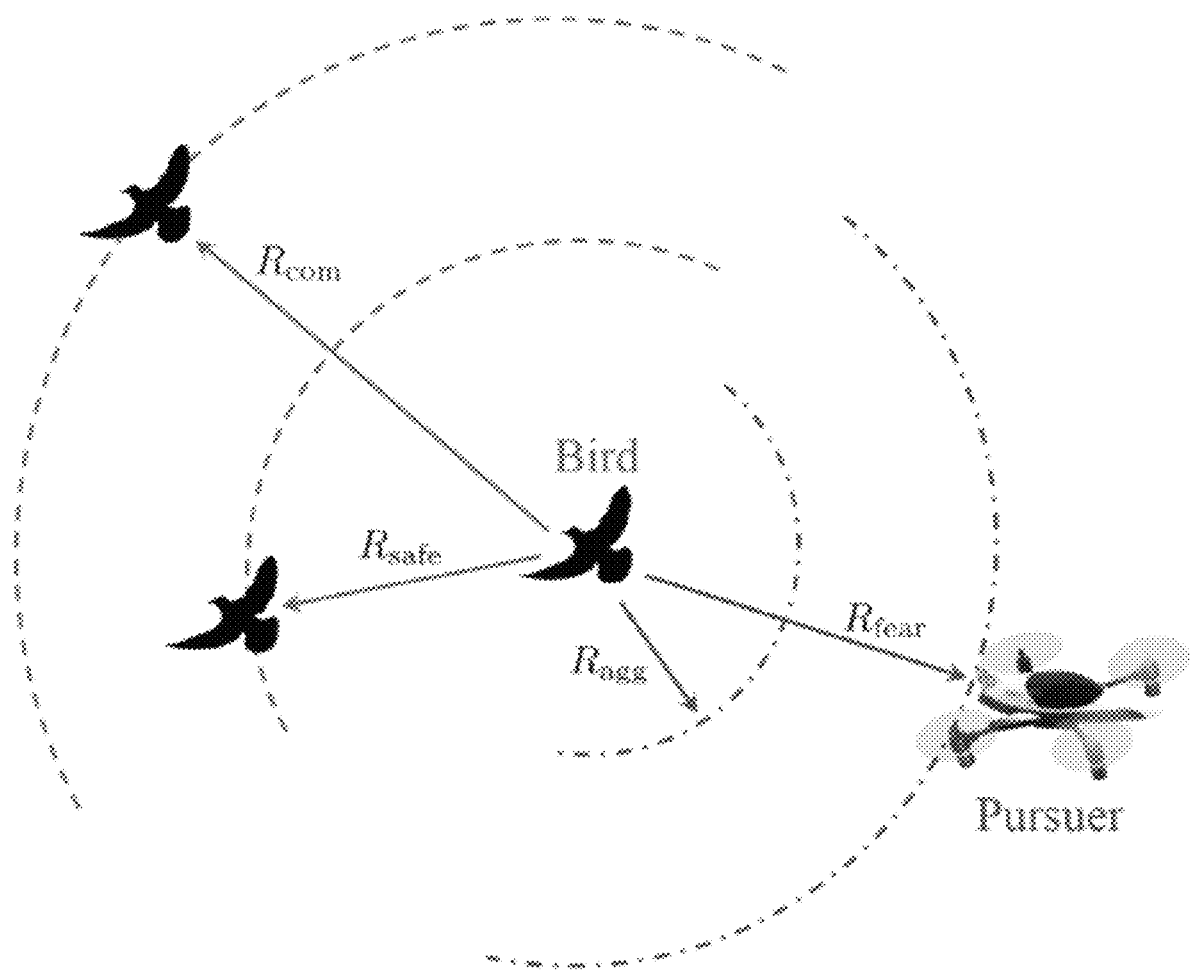
FIG. 5 illustrates several important distance variables in the flocking model in accordance with an embodiment of the invention.

FIG. 5 summarizes important distance variables that appear in the model in accordance with an embodiment of the invention. The terms $R_{safe}$ and $R_{com}$ have been defined already. The terms $R_{fear}$ and $R_{agg}$ ($<R_{fear}$) refer to critical distances in the bird-pursuer interaction, and it is assumed that both of these quantities are known for a given flock. The flock responds to a pursuer only when the pursuer is within a radius $R_{fear}$ of a member of the flock. Within $R_{fear}$, the evasive behaviour generally takes two different forms:

If the pursuer is within [$R_{agg}$, $R_{fear}$], the bird tries to accelerate radially away from the pursuer.

If the pursuer is within $R_{agg}$, the bird tries to outmaneuver the pursuer by turning and/or climbing rapidly.

Since the out-turning or 3-D behavior can have adverse implications for the stability of the flock, $R_{agg}$ can be treated as a lower bound for the permissible distance between the pursuer and the flock. H(•) can be modeled as follows:

$$H(r_{pi}) = \begin{cases} \frac{r_{pi}}{\|r_{ij}\|^3}, & \text{if } \|r_{pi}\| < R_{fear} \text{ and } r_{pi}^T \dot{r}_{pi} < 0 \\ 0 & \text{otherwise} \end{cases} \quad (5)$$

and a restriction that $\|r_{pi}\|$ $R_{agg}+\epsilon$ for all i, where $\epsilon>0$ is an arbitrarily-chosen constant can be imposed.

B. Herding Objectives

As noted above, the protected zone (PZ) is the spatial volume that needs to be kept free of birds. For illustrative purposes, in this example, PZ is assumed to be cylindrical with radius $R_{PZ}$. However, in many embodiments, the PZ can be other shapes. For modeling purposes, it can be assumed that birds fly along a constant, pre-selected heading, $\hat{v}_d$, when not disturbed by a pursuer. This is in fact true, for instance, for flocks flying to migration grounds considerably far from PZ. It is clear that the pursuer only needs to move the flock to a point from which its flight path (along $\hat{v}_d$) would no longer cross PZ. This target point is denoted as $x_{div}(t)$, noting that its exact position may change with time as described presently.

Figure 6:
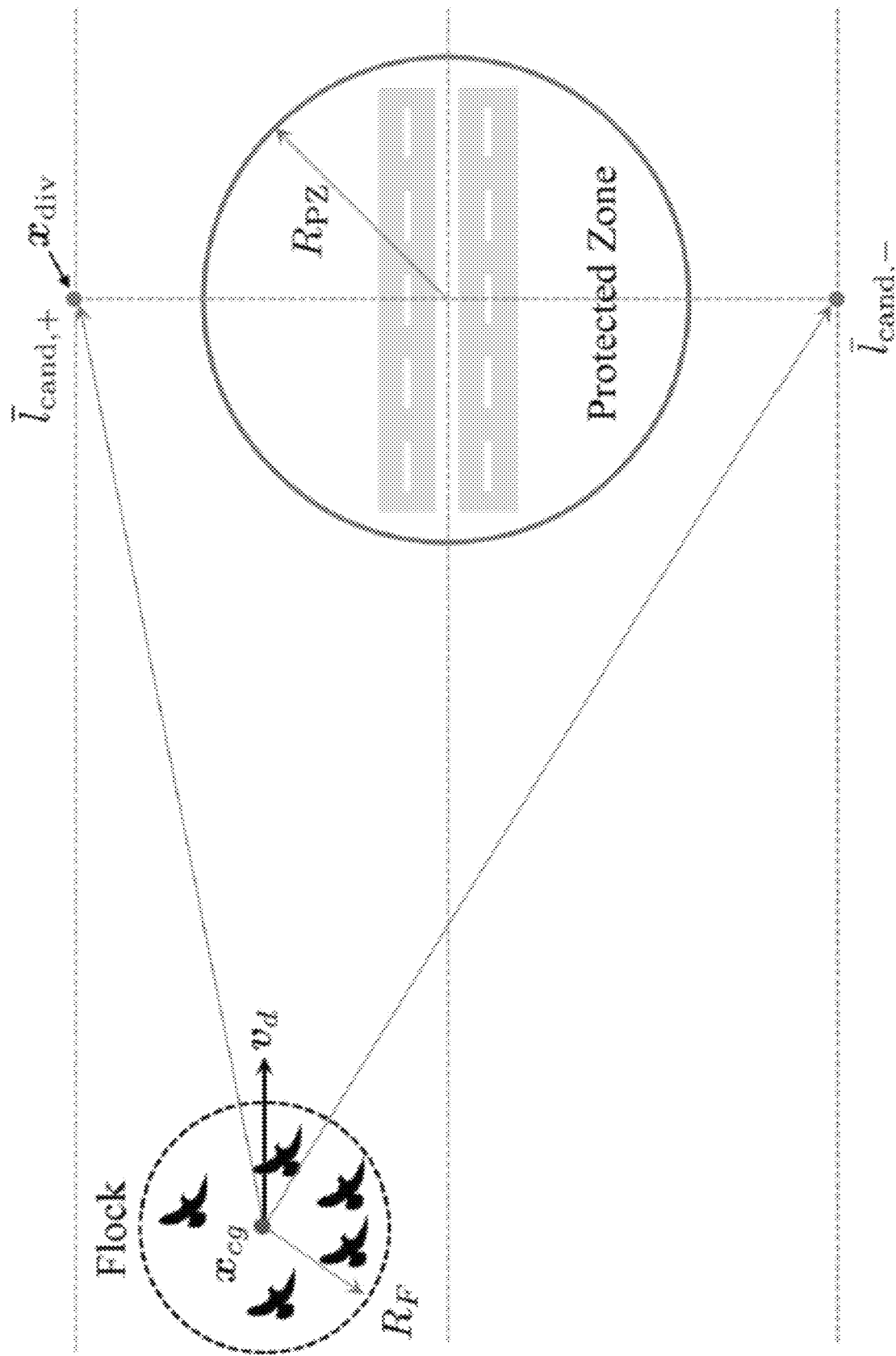
FIG. 6 illustrates a top view of two loci of candidate target points in accordance with an embodiment of the invention.

The global coordinate frame is defined with its origin placed at the centre of PZ, and its axes pointing north, east and up, respectively. Let h(t) denote the instantaneous altitude of the flock. First, two vertical lines (in the global frame) can be constructed which serve as loci for all possible target points. Recall that $v_d$ in (4) is the predetermined nominal flock velocity which satisfies $\hat{k}^T v_d=0$ where $\hat{k}$ is the unit vector pointing upwards in the global frame. Unit vector $\hat{v}_d^\perp$ is defined which satisfies $v_d \hat{v}_d^\perp = \hat{k}^T \hat{v}_d^\perp = 0$. The two candidate loci are then given by $\bar{l}_{cand,\pm}(a) = \pm(R_{PZ}+s)\hat{v}_d^\perp + a\hat{k}$ where $a \in \mathbb{R}$, and $s>R_F$ is a suitably chosen constant. $R_{div} \triangleq R_{PZ}+s$ is denoted. Of these candidate loci, the one closest to $x_{cg}$, at t=0 (the moment at which the herding commences) is selected, as illustrated in FIG. 6 in accordance with an embodiment of the invention. Finally, at each t, set the instantaneous target waypoint on the chosen locus as $x_{div} = (+/-)R_{div}\hat{v}_d^\perp + h(t)\hat{k}$. If the two loci are equidistant from $x_{cg}$, then any of the two loci can be chosen: however, this choice may persist for the remainder of the herding operation. This selection of herding target points is a logical extension from 2D to 3D when the herding algorithm does not seek to control the altitude of the flock. The objective of the herding algorithm is to prescribe a trajectory $x_p(t)$ for the pursuer which enables it to: (1) move the CG of the flock to $x_d$, in finite time; (2) avoid fragmentation of the flock; and (3) keep the flock outside the protected zone PZ during the course of herding.

C. Stability Analysis

In order to avoid fracturing the flock, conditions for flock stability can be modeled. These conditions can be used to select the gains and the underlying graph in (4) for analytical investigation when sufficient empirical data is not available to determine these parameters. The resulting robustness of the flock implies that the pursuer is free to approach the flock from any direction. As long as it maintains a certain minimum distance between itself and the flock, the flock will not undergo fragmentation.

C.I. Snapshot Dynamics, Steady States, and Linearization

To model snapshot dynamics, steady states, and linearization, two column vectors $x, v \in \mathbb{R}^{3n}$, formed by permuting the components of $x_i$ and $v_i$, respectively, $\forall i$:

$$x = [x_{11}, \ldots, x_{n1}, x_{12}, \ldots, x_{n2}, x_{13}, \ldots, x_{n3}]^T$$

are defined, and v is constructed in a similar manner. There exists a permutation matrix, denoted by $P_{3n} \in \mathbb{R}^{3n \times 3n}$, such that $$x = P_{3n} \begin{bmatrix} x_1 \\ x_2 \\ \vdots \\ x_n \end{bmatrix}, \begin{bmatrix} x_1 \\ x_2 \\ \vdots \\ x_n \end{bmatrix} = P_{3n}^{-1} x$$

Ignoring the pursuer-dependent terms, the flocking dynamics (4) can be written as $$\dot{x} = v$$

$$\dot{v} = -k_a(I_3 \otimes D_c B_c^T)v + k_g(v_d \otimes 1_n - v) - k_s(I_3 \otimes D_c Q(x) B_c^T)x \quad (6)$$

where $D_c(i,j) = -1$ if the $j^{th}$ edge is incoming at i, and $D_c(i,j) = 0$ otherwise. Here, $I_3$ the 3×3 identity matrix, while $\otimes$ denotes the Kronecker product. $D_c$ can be replaced with $B_c/2$ if the graph is undirected. The matrix $Q(x) \in \mathbb{R}^{p \times p}$ is a diagonal matrix satisfying $Q(j,j) = 1 - R_{safe}^3/\|e_j\|_3$.

In order to analyze the stability of the flock, a change of coordinates can be made: $\tilde{x}_i(t) = x_i(t) - v_d t$, $\tilde{v}_i(t) = v_i(t) - v_d$. Since $Q(x) = Q(\tilde{x})$, flocking dynamics can be written as $$\dot{\tilde{x}} = \tilde{v}$$

$$\dot{\tilde{v}} = -k_s(I_3 \otimes D_c Q(\tilde{x}) B_c^T)\tilde{x} - k_a(I_3 \otimes D_c B_c^T)\tilde{v} - k_g \tilde{v} \quad (7)$$

This is a nonlinear, autonomous system whose equilibrium solutions are given by $[\tilde{x}^0, 1_n \otimes 0_3]$, where $\tilde{x}^0$ satisfies $(I_3 \otimes D_c Q(\tilde{x}^0) B_c^T)\tilde{x}^0 = 0$.

Given an equilibrium configuration $\tilde{x}^0$, the family of equilibrium solutions obtained by rigid-body translation and rotation the flock are defined by $$S(\tilde{x}^0) = \{\tilde{x} | \tilde{x} = b \otimes 1_n + \alpha P_{3n}(I_n \otimes J) P_{3n}^{-1} \tilde{x}^0\} \quad (8)$$

where $b \in \mathbb{R}^3$, $J \in$ so (3), and $\alpha \in \mathbb{R}$.

Let $\delta \cdot$ denotes a small perturbation in the corresponding variable, and $e_i^0$ is the steady-state $i^{th}$ edge vector. Then, the linearization of (7) about an equilibrium point is given by $$\delta \dot{x} = \delta v$$

$$\delta \dot{v} = -\frac{3}{R^2}(I_3 \otimes D_c \Delta(e_1^{0^T} \delta e_1, \ldots, e_p^{0^T} \delta e_p) B_c^T)\tilde{x}^0 - (k_a(I_3 \otimes D_c B_c^T) + k_g I_{3n})\delta v$$

These equations can be written compactly as $$\begin{bmatrix} \delta \dot{x} \\ \delta \dot{v} \end{bmatrix} = G \begin{bmatrix} \delta x \\ \delta v \end{bmatrix},$$

where the Jacobian G is given by $$G = \begin{bmatrix} 0_{3n} & I_{3n} \\ -k_s A & -B \end{bmatrix}, \quad (9)$$

and $$B = k_a(I_3 \otimes D_c B_c^T) + k_g I_{3n} \quad (10)$$

$$A \delta x = \frac{3}{R^2}(I_3 \otimes D_c \Delta(e_1^{0^T} \delta e_1, \ldots, e_p^{0^T} \delta e_p) B_c^T)\tilde{x}^0$$

C.II. Spectral Properties of A and G

In order to determine the spectral properties of A and G:

Lemma 1. The null space of A defined in (10) is a superset of eigenvectors which correspond to a rigid body translation and rotation of the flock; i.e., $$\mathcal{N}(A) \supseteq \mathcal{N}_u \triangleq \text{span}([1,0,0]^T \otimes 1_n, [0,1,0]^T \otimes 1_n,$$

$$[0,0,1]^T \otimes 1_n, P_{3n}(I_n \otimes J_1) P_{3n}^{-1} \tilde{x}^0, P_{3n}(I_n \otimes J_2) P_{3n}^{-1} \tilde{x}^0,$$

$$P_{3n}(I_n \otimes J_3) P_{3n}^{-1} \tilde{x}^0)$$

where $J_1, J_2, J_3$ form a basis for so (3).

Proof: It is evident from (10) that $\mathcal{N}(A)$ is a superset of the vectors $\delta x$ which satisfy $(I_n \otimes B_c^T)\delta x = 0$ or $e_i^{0^T} \delta e_i = 0$ $\forall i = \{1, \ldots, p\}$. The former condition implies that $\delta x = k_1[1, 0, 0]^T \otimes 1_n + k_2[0, 1, 0]^T \otimes 1_n + k_3[0, 0, 1]^T \otimes 1_n$, where $k_1, k_2$, and $k_3$ are arbitrary constants. The latter condition is satisfied by $\delta x_i = \Sigma_{j=1}^3 k'_j J_j x_i$, for all constants $k'_j$.

Assumption 1. The matrix A has exactly six eigenvalues which are equal to 0. Therefore, $\mathcal{N}_u(A) = \mathcal{N}(A)$.

Assumption 1 is satisfied by connected undirected graphs and by strongly connected and balanced digraphs.

Assumption 2. The Jacobian G has the following properties:
1. All eigenvalues of G have non-positive real parts.
2. The algebraic and geometric multiplicities of the zero eigenvalue are equal to each other.
3. The null space $\mathcal{N}(G) = [n^T, 0_{1 \times 3n}]^T$, where $n \in \mathcal{N}(A) = \mathcal{N}_u(A)$.

Assumption 2 always holds for an undirected graph satisfying Assumption 1.

C.III. Stability Analysis

To perform the stability analysis, the center manifold theorem can be used to show that trajectories which start away from $S(\tilde{x}^0)$, at least locally, converge to $S(\tilde{x}^0)$ at an exponential rate. The proof proceeds in two steps. First, it is shown that there exists a center manifold when Assumption 2 is satisfied. It is noted that the set $S(\tilde{x}^0)$ is also a center manifold. In the second step, the property that center manifolds are arbitrarily close to each other can be used to complete the proof.

Lemma 2. Suppose that the flocking dynamics satisfy Assumption 2. Then, for every steady state $\tilde{x}^0$, there exists an invariant manifold $\varepsilon^c \triangleq \varepsilon^c(\tilde{x}^0)$ such that any trajectory starting around $\varepsilon^c$ converges at an exponential rate to $\varepsilon^c$.

Proof: From Assumption 2, it is known that the Jacobian G, evaluated at $\tilde{x}^0$, has six zero eigenvalues and the other eigenvalues are negative. Thus, it follows that from the center manifold theorem that there exists a six-dimensional center manifold $\varepsilon^c$ such that trajectories starting outside $\varepsilon^c$ converge at an exponential rate to $\varepsilon^c$.

Theorem 1. The set $S(\tilde{x}^0)$ is exponentially stable.

Proof: It is noted that $S(\tilde{x}^0)$ is itself a center manifold of the dynamics. From Lemma 2, it is known that trajectories starting in a neighborhood of $x^0$ converge at an exponential rate to the center manifold $\varepsilon^c(\tilde{x}^0)$. Recall that any two center manifolds about an equilibrium point $\tilde{x}^0$ differ by transcendentally small terms, and every equilibrium point in the vicinity of $\tilde{x}^0$ lies on every center manifold $\varepsilon^c(\tilde{x}^0)$. Thus, a trajectory starting in a neighborhood of $\tilde{x}^0$ converges exponentially fast to $S(\tilde{x}^0)$.

The discussion above shows that $S(\tilde{x}^0)$ is exponentially stable, and therefore, robust to small perturbations. In the context of herding, this implies that, for every direction in relation to the flock (or its center), there exists a nontrivial set of pursuer positions for which the underlying graph of the flock is preserved. Below are analytical formulae for estimating a set of permissible pursuer positions based purely on local topological considerations.

In addition to stability, for the purpose of herding, it is useful to have the property of time-scale separation between the synchronization of the flocking dynamics to $S(\tilde{x}^0)$ on the one hand, and the translational dynamics of the center of gravity of the flock (whose time constant, as shown in above, is $1/k_g$) on the other. This can be achieved by a suitable choice of $k_s$ and $k_a$ for a given graph topology.

D. Estimation of the Permissible Set of Pursuer Positions

The objective of this section is to derive approximations for the approach distance between a pursuer and the flock, based purely on the local interaction between the pursuer and the birds in a flock. This estimate supersedes the distance $R_{agg}$ in FIG. 2 from the point of view of preserving the local topology of the flock, and is used in below to determine the feasible positions for the pursuer in relation to the flock.

Figure 8:
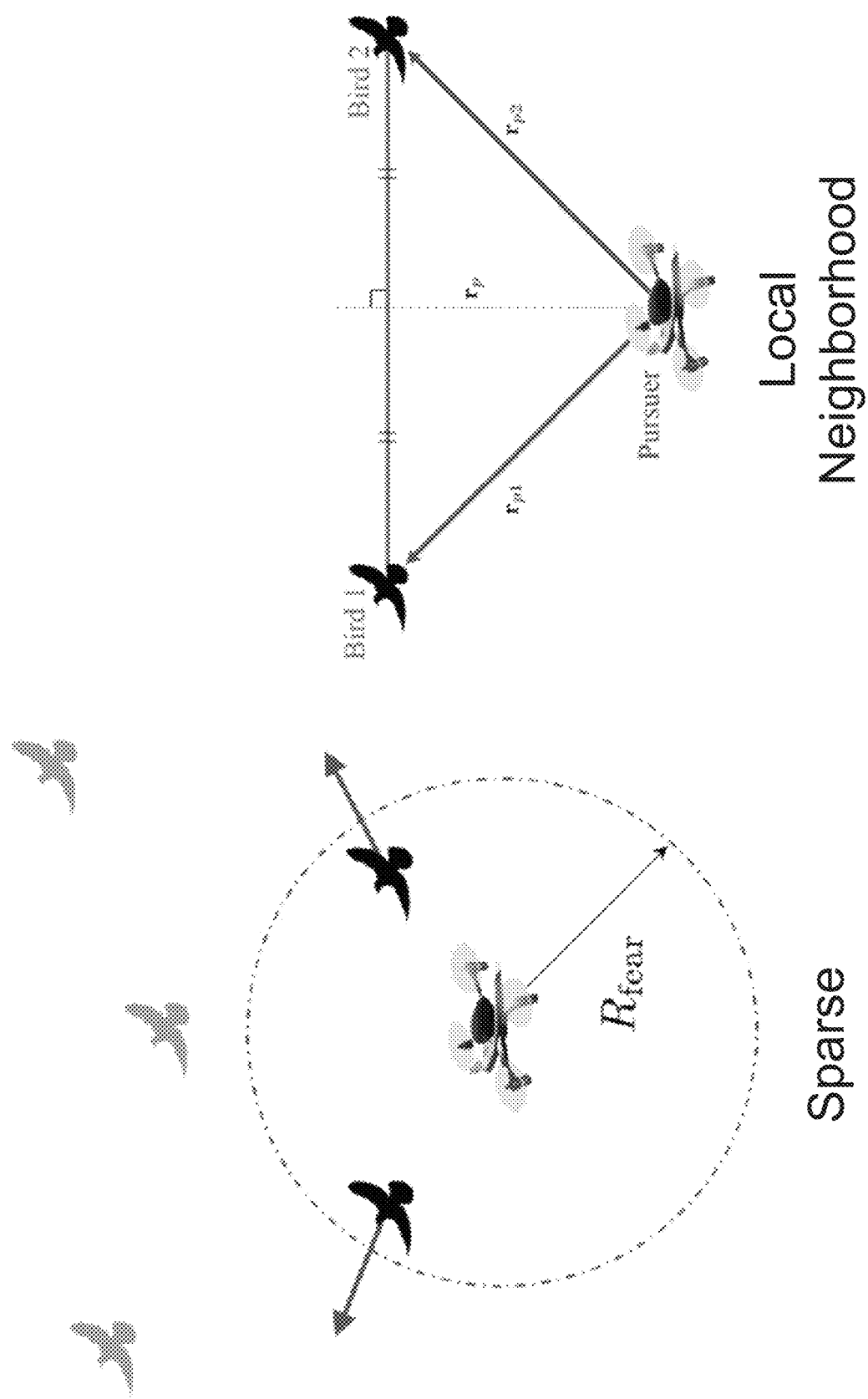
FIG. 8 illustrates a model with a single edge and the pursuer in accordance with an embodiment of the invention.

The influence exerted by the pursuer can cause one of two effects in extreme circumstances. In one case, the pursuer can push a bird to within an unacceptable distance of its neighbor. This scenario is likely in dense flocks, as shown in FIG. 7. In the second case, the pursuer can cause the link between two neighbors to be broken by pushing them beyond their communication distance $R_{com}$. This scenario, illustrated in FIG. 8, is generally more plausible in sparse flocks. The minimum permissible distance between two birds is written as $c\,R_{safe}$, where $c<1$ is a constant that depends on the species of birds and the pursuer represented by the drone.

D.I. Maintaining Minimum Allowable Distance Between Neighbors

Consider the situation wherein a bird on the boundary of the flock (labeled '1') is engaged by the pursuer. The bird tries to move away radially from the pursuer, and into the flock. In the worst case, the bird's evasive path points in the direction of a neighboring bird ('2') and there is force from other neighboring birds pulling '1' away from '2.' This is depicted in accordance with an embodiment of the invention in the dense flock of FIG. 7.

A conservative estimate for the minimum approach distance between the pursuer and the bird '1' can be found from the local neighborhood of FIG. 7. This is a repelling, "outward-pointing" (with respect to the flock) force on '1' due to '2' is countered by the inward-pointing force on '1' arising as a consequence of repulsion by the pursuer. Balancing these two forces when the distance between '1' and '2' is $c\,R_{safe}$ (thereby ensuring that the minimum approach distance is no less than $R_{safe}$) gives the minimum approach distance $\|r_{p1}\|_{min}$:

$$\frac{k_p}{\|r_{p1}\|_{min}^2} = k_s \left| cR_{safe}\left(1 - \frac{R_{safe}^3}{(cR_{safe})^3}\right)\right| \quad (11)$$

$$\Rightarrow \|r_{p1}\|_{min} = \sqrt{\frac{c^2 k_p}{(1-c^3)k_s R_{safe}}}$$

D.III. Preserving Communication Between Neighboring Birds

Figure 9:
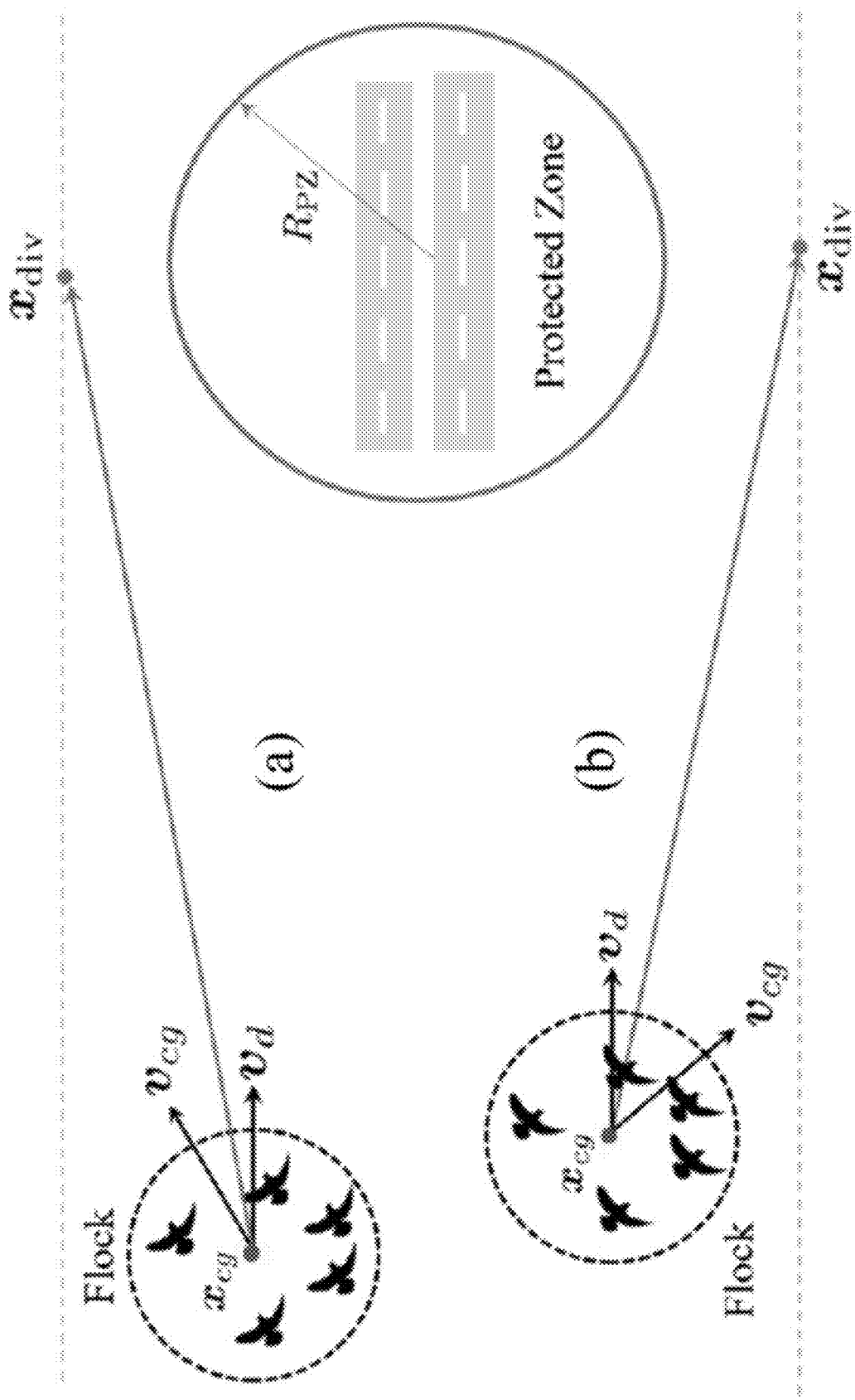
FIG. 9 illustrates two canonical scenarios with different signs of $q_k$ in accordance with an embodiment of the invention.

In sparse flocks, it is commonplace to find a linear topology, involving two or three agents forming an angle or a straight line with no other common neighbors. Consider a single edge, as shown in FIG. 9 in accordance with an embodiment of the invention, involving just two birds, and assume that the pursuer approaches along the perpendicular bisector of the edge. If $R_{com}$ is the maximum permissible distance between two boundary agents for the underlying graph to be preserved, the following condition for the minimum permissible $\|r_{p1}\|$ is obtained $$\frac{k_p}{\|r_{p1}\|^2} \times \frac{R_{com}}{2\|r_{p1}\|} = k_s\left(1 - \frac{R_{safe}^3}{R_{com}^3}\right)R_{com} \quad (12)$$

$$\Rightarrow \|r_{p1}\|_{min} = \left(\frac{k_p}{2k_s\left(1 - \frac{R_{safe}^3}{R_{com}^3}\right)}\right)^{1/3}$$

Below, example estimates for $\|r_{p1}\|_{min}$ are used as part of the motion planning strategy for the pursuer.

Definition 1. Define a set $X_p$ of permissible pursuer positions in relation to the flock as:

$$X_p = \left\{x_p \mid R_{min} \leq \min_{i \in V}\|x_p - x_i\| \leq R_{fear}\right\}, \quad (13)$$

where $R_{min}$ is the maximum of $R_{agg}$ and either (11) or (12) depending on the topology of the flock.

E. The M-Waypoint Herding Algorithm

The above established conditions for stability and robustness of the flock, and derived approximations for the approach distance between the flock and the pursuer. In this section, the problem of herding flocks without fracturing them is solved using waypoints generated by modeling the ensemble behavior of the flock. A version of the m-waypoint herding algorithm in accordance with an embodiment of the invention is illustrated in FIG. 10. A set of objectives that the pursuer's trajectory, $x_p(t)$, must satisfy in order herd the flock successfully are provided below. The m-waypoint algorithm is then obtained as an approximate, but efficient, solution to the problem of ensuring that $x_p(t)$ meets these objectives.

E.I. Formulation of the Herding Problem

The coordinates of the flock's centroid and its velocity are given by $$x_{cg} = \frac{1}{n}\sum_{i=1}^n x_i,\; v_{cg} = \frac{1}{n}\sum_{i=1}^n v_i.$$

Using (4) and (5), obtain $$\dot{x}_{cg} = v_{cg} \quad (14)$$

$$\dot{v}_{cg} = k_g(v_d - v_{cg}) + F_p(x_p) + f(x, v)$$

$$F_p(x_p) \triangleq \frac{k_p}{n} \sum_{i \in \mathcal{N}_p} H(r_{pi})$$

$$\dot{x}_p = u_p$$

where $\mathcal{N}_p$ denotes the subset of the flock that lies within $R_{fear}$ of the pursuer; the pursuer's velocity, $u_p$, is a control variable for the herding algorithm. The term $f(x,v)$ in zero when the graph is undirected (since $1_n^T B_c = 0$) or if it has synchronized to a steady state configuration. This would occur naturally when the flock synchronizes on a faster time scale than the dynamics of its CG. Since the goal is for the flock to point in the direction of the herding target point, it suffices to ensure that its velocity normal to an axis pointing towards $x_{div}$ is driven to zero. Define $$r_{dc}(t) \triangleq x_{div}(t) - x_{cg}(t), q \triangleq r_{dc} \times v_{cg} \quad (15)$$

Recall that $\hat{k}^T x_{div}(t) = \hat{k}^T x_{cg}(t) = h(t)$ (the altitude of the flock). Since $x_{div}(t)$ lies on a fixed vertical line for all t, then $\hat{k} \times \dot{x}_{div}(t) = 0$. Since $\dot{r}_{dc}(t) = \dot{x}_{div}(t) - v_{cg}(t)$, the following expression is obtained for the dynamics of q:

$$\dot{q} = r_{dc} \times \dot{v}_{cg} + \dot{x}_{div} \times v_{cg}$$

$$= -k_g q + k_g(r_{dc} \times v_d) + r_{dc} \times F_p(x_p) + r_{dc} \times f(x,v) + \dot{x}_{div} \times v_{cg}$$

Next, define $q_k \triangleq \hat{k}^T q$. Note that $\hat{k}^T(\dot{x}_{div} \times v_{cg}) = v_{cg}^T(\hat{k} \times \dot{x}_{div}) = 0$. Thus, the dynamics of $q_k$ are given by $$\dot{q}_k + k_g q_k = \hat{k}^T(r_{dc} \times (k_g v_d + f(x,v)) + r_{dc} \times F_p(x_p)) \quad (16)$$

Denote the amount of deviation that can be produced by placing the pursuer at $x_p$ using the right hand-side of (16):

$$\rho(x_p) \triangleq \hat{k}^T(r_{dc} \times (k_g v_d + f(x,v)) + r_{dc} \times F_p(x_p)) \quad (17)$$

If $\rho(x_p) = 0$ for all t, then it is possible to deduce from (16) that $q_k \to 0$ and the CG of the flock moves in a straight line (represented as a solid line in FIG. 9 in accordance with an embodiment of the invention) towards $x_{div}$ (from the definition of $q_k$). Further, note that the distance and the time required for herding could be reduced, as compared to moving the flock along the solid line, by pushing it rapidly towards the dashed line passing through $x_{div}$ in FIG. 9. The dashed line is parallel to $v_d$, and once the flock's CG reaches it, the herding algorithm can safely terminate. This requires that $q_k \geq 0$ uniformly (or $q_k \leq 0$ uniformly, depending on the choice of $x_{div}$) during the course of herding. Without loss of generality, it can be assumed that $x_{div}$ is chosen such that $\text{sign}(\hat{k}^T(v_d \times r_{dc})) > 0$ while commencing herding and set the control objective to maximizing $\rho(x_p) \geq 0$ while $\text{sign}(\hat{k}^T(v_d \times r_{dc})) > 0$ (see FIG. 9).

E.II. Calculating m Waypoints

A solution to the aforementioned control problem is to compute the trajectory of $x_p(t)$ which maximizes $\rho(x_p)$, and get the pursuer to track it. It is known that a flock tends to deform into a concave shape locally under persistent pressure from a pursuer, which is known to dent the effectiveness of the pursuit. Furthermore, over-stressing one or more birds continuously over an extended period of time carries the risk of the distressed birds attempting aggressive evasive maneuvers and fragmenting the flock. To avoid these problems, a sub-optimal approach can be employed wherein the flock is engaged through different waypoints in a given timeframe.

The waypoints are chosen by sampling the set $X_p$ from Definition 1. Sampling is preferred to statically defined waypoints because it allows the algorithm to be agnostic to the exact geometry of the flock. This is useful when the flock is not necessarily best represented as a convex shape; for instance, star-shaped flocks and flocks with a curvilinear geometry. The set of m waypoints can be formally identified as follows.

Definition 2. The set $X_p^m$ is defined by construction. The waypoint selection algorithm, illustrated in accordance with an embodiment of the invention in FIG. 11, samples $X_p$ uniformly. Next, up to m waypoints with the highest deviation are identified such that no two waypoints are within a prescribed distance, denoted $\delta_w$, of each other. These waypoints constitute the set $X_p^m$.

Even for a convex shaped flock, the set $X_p^m$ need not be connected. This enables the use of random sampling for construction.

F. Motion Planning for the Pursuer

The motion planner solves for the pursuer's velocity $u_p(t)$ by commanding one of two motions, as follows.

1. FLY: the pursuer takes the fastest path to the commanded node. Collision avoidance is achieved using artificial potential fields, an alternative to which is a real-time, online motion planner.
2. ENGAGE: using a virtual leader-based approach, the pursuer commands $u_p(t)$ to maintain its position at the chosen waypoint in relation to the flock's centroid for a pre-determined duration $\tau_e$. The engagement is terminated if the distance between two neighboring birds in $\mathcal{N}_p$ approaches the communication radius, $R_{com}$.

G. Tuning the Herding Algorithm

In order to promote successful herding, a condition is derived in the form of the minimum allowable distance from the protected zone at which the herding must begin. If the herding commences beyond this distance, it will succeed with an elevated likelihood. Assume that $f(x, v) = 0$; i.e., the underlying graph is undirected or the flock has synchronized to a steady state.

To begin, ignore the dynamics of the pursuer, and recall that the control objective is to maximize $\rho(x_p) \geq 0$. Consider the conservative case $\rho(x_p) = 0$ for all t during the course of herding. This case is limiting in that the distance at which the herding needs to be commenced can be lesser when larger values of $\rho(x_p)$ are attainable.

Figure 12:
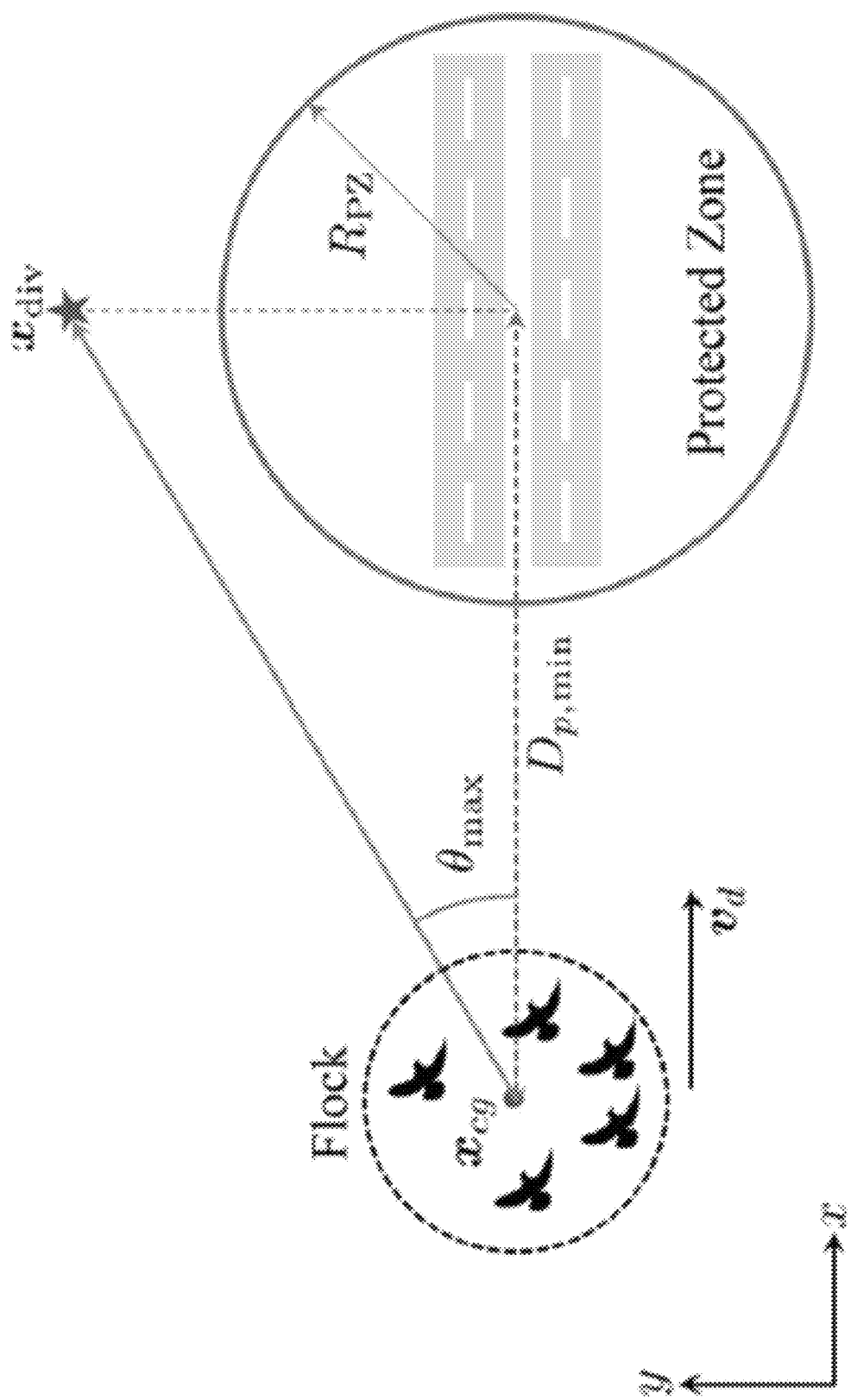
FIG. 12 illustrates one half of the cone outside which the herding should start in accordance with an embodiment of the invention.

In order to achieve $\rho(x_p) = 0$, set $x_p = x_p^*$ where $F_p(x_p^*) = -k_g(\hat{k}^T(\hat{r}_{dc} \times v_d))(\hat{k} \times \hat{r}_{dc})$. Since $\hat{r}_{dc} = r_{dc}/\|r_{dc}\|$, and $v_d$ lie in the horizontal plane, it follows that $\|F_p\| = k_g\|\hat{r}_{dc} \times v_d\|$. Let $\rho_F$ denote the upper bound on $\|F_p\|$, which is known. It is clear then that the flock should be made to satisfy $\|\hat{r}_{dc} \times v_d\| < \rho_F/k_g$ $\forall t$, which, in turn, means that the flock must be kept outside the cone shown in FIG. 12. This is an important insight: it shows that the herding is successful only if it begins when the horizontal distance between the centre of the flock and the center of PZ is greater than or equal to $$D_{p,min} \triangleq \frac{R_{div}}{\tan \theta_{max}}, \theta_{max} = \sin^{-1}\left(\frac{\rho_F}{k_g \|v_d\|}\right), \quad (18)$$

where $R_{div}$ was defined above.

While the solution $x_p^*$ appears to solve the problem in principle, there is the possibility that the trajectory $x_p^*$ may not be feasible. Furthermore, the motion planning algorithm adopted here requires that the pursuer engage with an entire "front" of the flock rather than specific individual birds. In particular, it means that the engagement between the pursuer and the flock takes place in pulses. Processes described herein can be refactored in light of this pulsed interaction.

Figure 14:
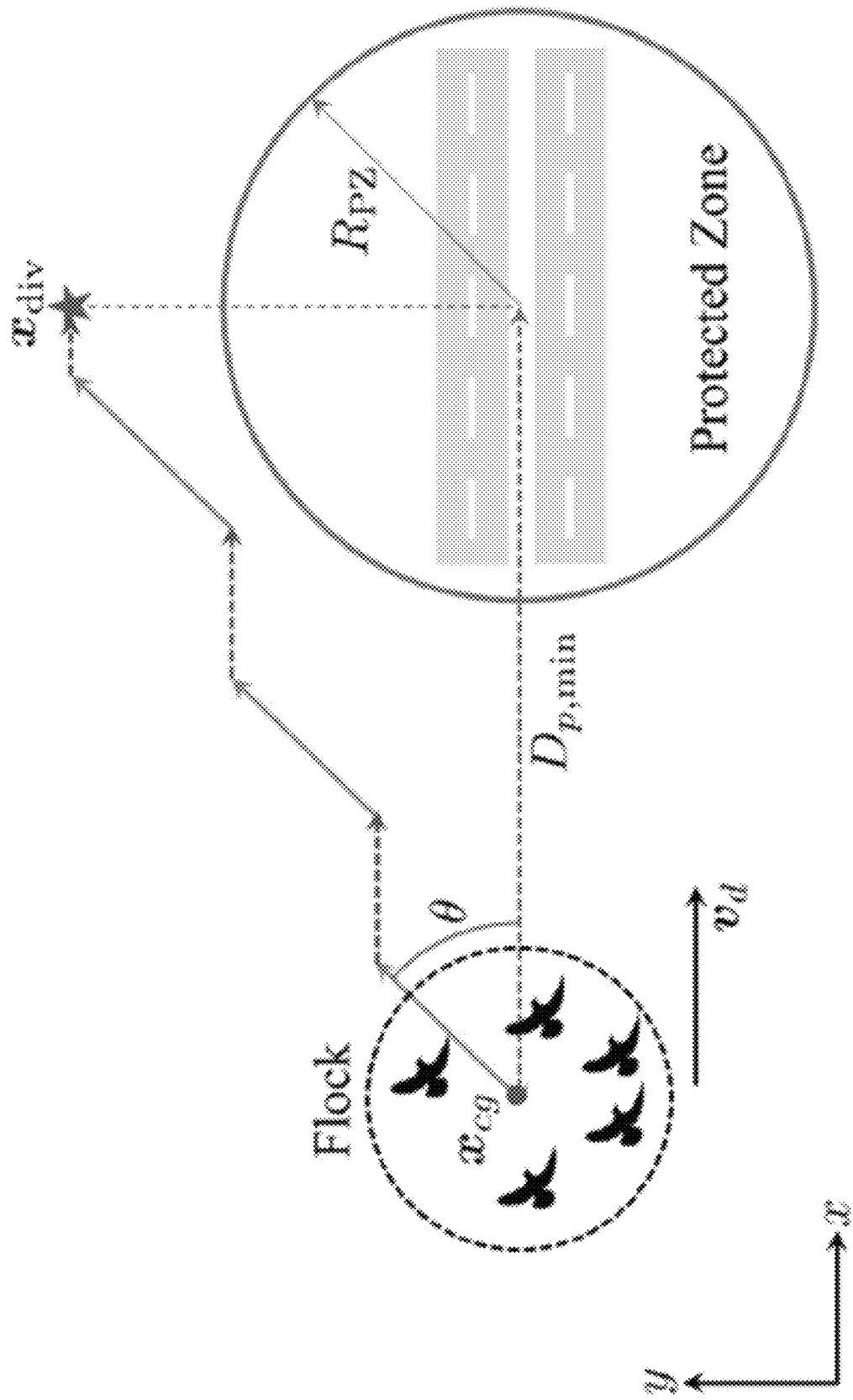
FIG. 14 is an example of flock motion in the presence of a pursuer and without a pursuer in accordance with an embodiment of the invention.

Let $\tau_e$ denote the duration of any given engagement between the pursuer and the flock, and let $\tau_f$ denote the time taken by the bird to fly between two waypoints. During the time $\tau_f$, the flock receives no external stimulus and its velocity tends to align to $v_d$. Assuming that an engagement begins at time $t_0$, the dynamics of the flock in the time interval [$t_0$, $t_0+\tau_e+\tau_f$] can be described via the switching dynamics $$\dot{v}_{cg} + k_g v_{cg} = \begin{cases} k_g v_d^{\|}, & t \in [t_0, t_0 + \tau_e) \\ k_g v_d, & t \in [t_0 + \tau_e, t_0 + \tau_e + \tau_f) \end{cases} \quad (19)$$

where $v_d^{\|} = v_d + F_p/k_g$ (see FIG. 13 as an example in accordance with an embodiment of the invention). When $x_p = x_p^*$, $v_d^{\|}$ is along $r_{dc}$ at every instant in time, which is why the superscript $\|$ is used here. Assume that the flock switches instantaneously between two states. During the engagement phase, the flock moves at an angle $\theta$ to the original direction coinciding with $v_d$. When the pursuer does not engage the flock, it moves along $v_d$. This is depicted in FIG. 14 in accordance with an embodiment of the invention.

The terms $\|v_d^{\|}\|$ and $\theta$ can be estimated empirically since the precise interaction between the flock and the pursuer is highly case-specific. The magnitude of $v_d^{\|}$ depends on whether the flock is driven from the front or from the rear. Since the intent is for the net motion to be perpendicular $v_d$, it is reasonable to assume that the average force also acts perpendicular to $v_d$. Thus, $$\|v_d^{\|}\| = \sqrt{\|v_d\|^2 + \frac{\|F_p\|^2}{k_g^2}}, \theta = \cos^{-1}(\|v_d\|/\|v_d^{\|}\|)$$

Consequently,

Theorem 2. Given the approximate values of $\|v_d^{\|}\|$ and $\theta$, the refined value of $D_{p,min}$ is given by $$D_{p,min} = R_{div} \cot\theta \left(1 + \frac{\tau_f}{\tau_e}\right)$$

Proof Let $n_s$ denote the number of engagement pulses. From FIG. 14, it is apparent that there can be at most $n_s$ pulses wherein the flock is not engaged with the pursuer. During each engagement pulse, referring to the geometric convention of FIG. 14, the flock shifts through a distance $\|v_d^{\|}\| \tau_e \sin \theta$. Thus, $$n_s = \frac{R_{div}}{\|v_d^{\|}\| \tau_e \sin\theta}$$

Furthermore, during each engagement phase, the flock translates horizontally through a distance $\|v_d^{\|}\| \tau_e \cos \theta$. During the non-engagement phase, the horizontally translation is at moat $\|v_d\|\tau_f$. Thus, the minimum horizontal translation is given by $$D_{p,min} = n_s(\|v_d\|\tau_f + \|v_d^{\|}\|\tau_e \cos\theta)$$
$$= R_{div}\left(\frac{\|v_d\|}{\|v_d^{\|}\|}\frac{\tau_f}{\tau_e}\frac{1}{\sin\theta} + \cot\theta\right)$$

Setting $\cos\theta = \|v_d\|/\|v_d^{\|}\|$ yields $$D_{p,min} = R_{div}\cot\theta\left(1 + \frac{\tau_f}{\tau_e}\right).$$

Notice that (18) is recovered if when $\tau_f=0$ and $\theta=\theta_{max}$. This completes the proof. Using the above, flock flight dynamics can be modeled and effective waypoints can be generated.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An autonomous bird flock herding system, comprising:
    at least one bird location sensor;
    an unmanned aerial vehicle; and
    a flock herding control system, comprising:
        a processor; and
        a memory, the memory containing a flock herding application, where the flock herding application directs the processor to:
            obtain bird position data from the at least one bird location sensor, where the bird position data describes the location of birds in a flock of birds, where the flock of birds forms a non-convex hull;
            determine if the flock of birds will enter a protected zone;
            generate a set of waypoints for positioning the unmanned aerial vehicle using a predictive flock dynamics model, where for each waypoint in the set of waypoints, the unmanned aerial vehicle is predicted to not split the flock when at the waypoint;
            uniformly sample the set of waypoints to produce a subsample of waypoints;
            score each given waypoint in the subsample of waypoints based on whether or not placing the unmanned aerial vehicle at the given waypoint will move the flock of birds in a desired direction and the distance to other waypoints in the subsample of waypoints;
            sort the subsample of waypoints based on score;
            select a waypoint from the sorted subsample of waypoints having the highest score;
            instruct the unmanned aerial vehicle to navigate to the selected waypoint such that the flock of birds will, in response to the presence of the unmanned aerial vehicle at the at least one waypoint, change trajectory away from the protected zone.

2. The autonomous bird flock herding system of claim 1, wherein the flock of birds will, in response to the presence of the unmanned aerial vehicle at the selected waypoint maintain integrity such that a centroid of the flock and a shape of the flock are maintained and communication links between any two neighboring birds of the flock are not broken.

3. The autonomous bird flock herding system of claim 1, wherein the protected zone is a cylinder.

4. The autonomous bird flock herding system of claim 1, wherein the protected zone is over an airport.

5. The autonomous bird flock herding system of claim 1, wherein the at least one bird location sensor is an avian radar.

6. The autonomous bird flock herding system of claim 1, further comprising at least one environmental sensor; and
the flock herding application further directs the processor to:
obtain environment data describing environmental conditions proximal to the protected zone from the at least one environmental sensor; and
generate the set of waypoints using the environment data.

7. The autonomous bird flock herding system of claim 6, wherein the environment data describes the position of airplanes.

8. The autonomous bird flock herding system of claim 6, wherein the environment data describes wind speed.

9. The autonomous bird flock herding system of claim 1, wherein the flock herding application further directs the processor to:
obtain updated bird position data;
update the set of waypoints based on the updated bird position data;
uniformly sample the updated set of waypoints to produce an updated subsample of waypoints;
score each specific waypoint in the updated subsample of waypoints based on whether or not placing the unmanned aerial vehicle at the specific waypoint will move the flock of birds in a desired direction and the distance to other waypoints in the updated subsample of waypoints;
sort the updated subsample of waypoints based on score; and
select a new waypoint from the sorted, updated subsample of waypoints having the highest score.

10. The autonomous bird flock herding system of claim 1, further comprising:
a second unmanned aerial vehicle; and
wherein the flock herding application further directs the processor to:
generate a second set of waypoints using the predictive flock dynamics model;
uniformly sample the second set of waypoints to produce a second subsample of waypoints;
score each specific waypoint in the second subsample of waypoints based on whether or not placing the unmanned aerial vehicle at the specific waypoint will move the flock of birds in a desired direction and the distance to other waypoints in the second subsample of waypoints;
sort the second subsample of waypoints based on score;
select a second waypoint from the sorted second subsample of waypoints having the highest score; and
instruct the second unmanned aerial vehicle to navigate to the selected second waypoint such that the flock of birds will, in response to the presence of the second unmanned aerial vehicle at the given at least one waypoint, change trajectory away from the protected zone.

11. A method for the autonomous herding of flocks of birds comprising:
obtaining, using a flock herding control system, bird position data from at least one bird location sensor, where the bird position data describes the location of birds in a flock of birds, where the flock of birds forms a non-convex hull;
determining, using the flock herding control system, if the flock of birds will enter a protected zone;
generating, using the flock herding control system, a set of waypoints using a predictive flock dynamics model for an unmanned aerial vehicle, where for each waypoint in the set of waypoints, the unmanned aerial vehicle is predicted to not scars split the flock when at the waypoint;
uniformly sampling the set of waypoints to produce a subsample of waypoints;
scoring each given waypoint in the subsample of waypoints based on whether or not placing the unmanned aerial vehicle at the given waypoint will move the flock of birds in a desired direction and the distance to other waypoints in the subsample of waypoints;
sorting the subsample of waypoints based on score;
selecting a waypoint from the sorted subsample of waypoints having the highest score; and
instructing, using the flock herding control system, the unmanned aerial vehicle to navigate to the selected waypoint such that the flock of birds will, in response to the presence of the unmanned aerial vehicle at the at least one waypoint, change trajectory away from the protected zone.

12. The method for the autonomous herding of flocks of birds of claim 11, wherein the flock of birds will, in response to the presence of the unmanned aerial vehicle at the selected waypoint maintain integrity such that a centroid of the flock and a shape of the flock are maintained and communication links between any two neighboring birds of the flock are not broken.

13. The method for the autonomous herding of flocks of birds of claim 11, wherein the protected zone is a cylinder.

14. The method for the autonomous herding of flocks of birds of claim 11, wherein the protected zone is over an airport.

15. The method for the autonomous herding of flocks of birds of claim 11, wherein the at least one bird location sensor is an avian radar.

16. The method for the autonomous herding of flocks of birds of claim 11, further comprising
obtaining, using the flock herding control system, environment data from at least one environmental sensor describing environmental conditions proximal to the protected zone from the at least one environmental sensor; and
generating the set of waypoints using the environment data.

17. The method for the autonomous herding of flocks of birds of claim 16, wherein the environment data describes the position of airplanes.

18. The method for the autonomous herding of flocks of birds of claim 16, wherein the environment data describes wind speed.

19. The method for the autonomous herding of flocks of birds of claim 16, further comprising:
obtaining, using the flock herding control system, updated bird position data;
updating, using the flock herding control system, the set of waypoints based on the updated bird position data;

uniformly sampling the updated set of waypoints to produce an updated subsample of waypoints;

scoring each specific waypoint in the updated subsample of waypoints based on whether or not placing the unmanned aerial vehicle at the specific waypoint will move the flock of birds in a desired direction and the distance to other waypoints in the updated subsample of waypoints;

sorting the updated subsample of waypoints based on score; and selecting a new waypoint from the sorted, updated subsample of waypoints having the highest score.

20. The method for the autonomous herding of flocks of birds of claim 16, further comprising:

generating, using the flock herding control system, a second set of waypoints using the predictive flock dynamics model;

uniformly sampling the second set of waypoints to produce a second subsample of waypoints;

scoring each specific waypoint in the second subsample of waypoints based on whether or not placing the unmanned aerial vehicle at the specific waypoint will move the flock of birds in a desired direction and the distance to other waypoints in the second subsample of waypoints;

sorting the second subsample of waypoints based on score;

selecting a second waypoint from the sorted second subsample of waypoints having the highest score; and instructing, using the flock herding control system, a second unmanned aerial vehicle to navigate to the selected second waypoint such that the flock of birds will, in response to the presence of the second unmanned aerial vehicle at the given at least one waypoint, change trajectory away from the protected zone.

* * * * *